United States Patent
Tsuru

(10) Patent No.: US 11,343,588 B2
(45) Date of Patent: May 24, 2022

(54) INFORMATION PROCESSING APPARATUS, INFORMATION PROCESSING METHOD, TRANSMISSION APPARATUS, AND TRANSMISSION METHOD

(71) Applicant: SATURN LICENSING LLC, New York, NY (US)

(72) Inventor: Takumi Tsuru, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/976,980

(22) PCT Filed: Mar. 13, 2019

(86) PCT No.: PCT/JP2019/010147
§ 371 (c)(1),
(2) Date: Aug. 31, 2020

(87) PCT Pub. No.: WO2019/188269
PCT Pub. Date: Oct. 3, 2019

(65) Prior Publication Data
US 2021/0021910 A1    Jan. 21, 2021

(30) Foreign Application Priority Data

Mar. 27, 2018  (JP) .............................. JP2018-059345

(51) Int. Cl.
*H04N 21/81*   (2011.01)
*G10L 15/22*   (2006.01)
(Continued)

(52) U.S. Cl.
CPC ......... *H04N 21/8133* (2013.01); *G10L 15/22* (2013.01); *H04N 21/42203* (2013.01);
(Continued)

(58) Field of Classification Search
None
See application file for complete search history.

(56) References Cited

U.S. PATENT DOCUMENTS 6,741,791 B1    5/2004  Wymore et al.
2006/0259299 A1  11/2006  Kato et al.
(Continued)

FOREIGN PATENT DOCUMENTS

EP    2 355 093 A2    8/2011
JP    2013-187781 A    9/2013
(Continued)

OTHER PUBLICATIONS

International Search Report dated Apr. 23, 2019 in PCT/JP2019/010147 filed on Mar. 13, 2019, 2 pages.
(Continued)

*Primary Examiner* — James R Marandi
(74) *Attorney, Agent, or Firm* — Chris Kolefas

(57) ABSTRACT

The present technology relates to an information processing apparatus, information processing method, transmission apparatus, and transmission method, capable of improving the convenience of a voice AI assistance service used in cooperation with content.

Provided is an information processing apparatus including a processing unit configured to process, in using a voice AI assistance service in cooperation with content, specific information associated with a universal invoking name included in a voice uttered by a viewer watching the content on the basis of the universal invoking name and association information, the universal invoking name being common to a plurality of programs that perform processing corresponding to the voice uttered by the viewer as an invoking name used for invoking the program, the association information being associated with the specific information to each of the (Continued)

programs. The present technology can be applied to a system in cooperation with a voice AI assistance service, for example.

19 Claims, 25 Drawing Sheets

(51) Int. Cl.
| | |
|---|---|
| *H04N 21/422* | (2011.01) |
| *H04N 21/84* | (2011.01) |
| *H04N 21/4722* | (2011.01) |
| *H04N 21/845* | (2011.01) |
| *G06F 3/16* | (2006.01) |
| *H04N 21/235* | (2011.01) |
| *H04N 21/439* | (2011.01) |
| *H04N 21/6587* | (2011.01) |

(52) U.S. Cl.
CPC ............ *H04N 21/84* (2013.01); *G06F 3/167* (2013.01); *G10L 2015/223* (2013.01); *H04N 21/235* (2013.01); *H04N 21/439* (2013.01); *H04N 21/4722* (2013.01); *H04N 21/6587* (2013.01); *H04N 21/8456* (2013.01)

(56) References Cited

U.S. PATENT DOCUMENTS

| | | | |
|---|---|---|---|
| 2015/0023481 | A1 | 1/2015 | Wu et al. |
| 2015/0382047 | A1 | 12/2015 | Van Os et al. |
| 2019/0034542 | A1* | 1/2019 | Ming ..................... G10L 15/22 |
| 2019/0104316 | A1* | 4/2019 | Da Silva Pratas Gabriel ............ H04N 21/4728 |
| 2019/0371329 | A1* | 12/2019 | D'Souza ........... H04M 3/42204 |

FOREIGN PATENT DOCUMENTS

| | | | |
|---|---|---|---|
| JP | 2014-153663 A | | 8/2014 |
| JP | 2015-22310 A | | 2/2015 |
| WO | WO 2018/005334 | * | 1/2018 ............. G10L 15/22 |

OTHER PUBLICATIONS

Haase et al., "Alexa, Ask Wikidata! Voice interaction with knowledge graphs using Amazon Alexa", [online], Oct. 22, 2017, Proceedings of the ISWC 2017 Posters & Demonstrations and Industry Tracks co-located with 16th International Semantic Web Conference (ISWC 2017), CEUR Workshop Proceedings, vol. 1963, ISSN: 1613-0073, Retrieved from the Internet: URL:http://ceur-ws.org/Vol-1963/paper576.pdf and URL:http://ceur-ws.org/Vol-1963/, pp. 1-4 (15 total pages).

Isbitski, "Tips for Choosing an Invocation Name for Your Alexa Custom Skill", [online] May 20, 2016, Alexa Blogs, Amazon.Com, Inc., Retrieved form the Internet: URL:https://developer.amazon.com/ja/blogs/alexa/post/Tx1I0GCST7P0I00/tips-for-choosing-an-invocation-name-for-your-alexa-custom-skil-, pp. 1-7.

Goyal, "How to build a Skill for Amazon Echo device on Alexa", [online], Jun. 12, 2017, Humble Bits, Retrieved from the Internet: URL:http://blogs.quovantis.com/build-a-skill-for-amazon-echo-device-on-alexa/, pp. 1-27.

* cited by examiner

FIG. 10

```
<MPD availabilityStartTime='2018-01-29T18:00:00Z' >
  <Period start="PT0S' >
    <EventStream schemeIdUri='urn:XXX' >
      <Event messageData='XXX Drama' >
    </EventStream>
  </Period>
  <Period start='PT1H0M0S' >
    <EventStream schemeIdUri='urn:XXX' >
      <Event messageData='XXX Quiz' >
    </EventStream>
  </Period>
  ...
</MPD>
```

FIG. 16

```
Content-Type: Multipart/related; boundary="XXX"; type=audio/wav

--XXX
Content-Type: audio/wav

[VOICE DATA]
--XXX
Content-Type: application/json

{
 "ContextMetaDatas" : [
   ["name":"ChannelNumber", "value":"8.1"],
   ["name":"MediaTime", "value":"2018-01-29T18:00:05Z"]
 ]
}
--XXX--
```

```
<MPD availabilityStartTime='2018-01-29T18:00:00Z'>
 <Period start='PT0S'>
  <EventStream schemeIdUri='urn:XXX'>
   <Event messageData='[XML TEXT]'>
  </EventStream>
 </Period>
 ...
</MPD>
```

FIG. 23

```
<?xml version="1.0" encoding="utf-8"?>
<SkillRegistrationInfo version="1">
<InvocationName>XXX Quiz</InvocationName>
<EndpointUrl>https://XXX</EndpointUrl>
<Intents>
<Intent name="ColorAnswerIntent">
<slot name="Color" type="LIST_OF_COLORS"/>
</Intent>
</Intents>
<SlotValues type="LIST_OF_COLORS">
<value>blue</value>
<value>red</value>
<value>green</value>
<value>yellow</value>
</SlotValues>
<SampleUtterances>
<SampleUtterance intentName="ColorAnswerIntent" utterance="{Color}"/>
<SampleUtterance intentName="ColorAnswerIntent" utterance="Answer is {Color}"/>
</SampleUtterances>
</SkillRegistrationInfo>
```

INFORMATION PROCESSING APPARATUS, INFORMATION PROCESSING METHOD, TRANSMISSION APPARATUS, AND TRANSMISSION METHOD

TECHNICAL FIELD

The present technology relates to information processing apparatuses, information processing methods, transmission apparatuses, and transmission methods. In particular, the present technology relates to an information processing apparatus, information processing method, transmission apparatus, and transmission method, capable of improving the convenience of a voice artificial intelligence (AI) assistance service used in cooperation with content.

BACKGROUND ART

A broadcast application that runs in conjunction with broadcast content is developed (e.g., see Patent Document 1). The use of the broadcast application makes it possible, for example, to display broadcast content-related information.

Further, the technology regarding voice recognition that analyzes the user's utterance contents is developed (e.g., see Patent Document 2). For example, this technology applied to a television set or a portable terminal device makes it possible to analyze words uttered by a user and execute processing corresponding to the utterance.

CITATION LIST

Patent Document

Patent Document 1: Japanese Patent Application Laid-Open No. 2013-187781
Patent Document 2: Japanese Patent Application Laid-Open No. 2014-153663

SUMMARY OF THE INVENTION

Problems to be Solved by the Invention

In recent years, the voice AI assistance service has been rapidly spreading. There is a case where the voice AI assistance service is used in cooperation with broadcast content or a broadcast application played back by a receiver such as television sets. In this case, an invoking name used to invoke a program that performs processing corresponding to the voice uttered by the viewer who watches the broadcast content is different for each broadcast station or broadcast program.

Thus, the viewer must know all the invoking names and switch the invoking names for each target, which may reduce the convenience of a voice AI assistance service used in cooperation with content such as broadcast content. As such, there has been a demand for technology for improving the convenience of the voice AI assistance service.

The present technology is made in view of such circumstances and is intended to improve the convenience of the voice AI assistance service used in cooperation with the content.

Solutions to Problems

An information processing apparatus according to a first aspect of the present technology includes a processing unit configured to process, in using a voice AI assistance service in cooperation with content, specific information associated with a universal invoking name included in a voice uttered by a viewer watching the content on the basis of the universal invoking name and association information, the universal invoking name being common to a plurality of programs that perform processing corresponding to the voice uttered by the viewer as an invoking name used for invoking the program, the association information being associated with the specific information to each of the programs.

The information processing apparatus according to the first aspect of the present technology can be an independent device or can be an internal block that constitutes one device. In addition, an information processing method according to the first aspect of the present technology is an information processing method corresponding to the above-described information processing apparatus according to the first aspect of the present technology.

According to the first aspect of the present technology, there is provided an information processing method executed by an information processing apparatus, the method including processing, by the information processing apparatus, in using a voice AI assistance service in cooperation with content, specific information associated with a universal invoking name included in a voice uttered by a viewer watching the content on the basis of the universal invoking name and association information, the universal invoking name being common to a plurality of programs that perform processing corresponding to the voice uttered by the viewer as an invoking name used for invoking the program, the association information being associated with the specific information to each of the programs.

A transmission apparatus according to a second aspect of the present technology includes a generation unit configured to generate metadata including a specific invoking name in using a universal invoking name and association information in a voice AI assistance service in cooperation with content, the universal invoking name being common to a plurality of programs that perform processing corresponding to a voice uttered by the viewer watching the content as an invoking name used for invoking the program, the association information being associated with the specific invoking name to each of the programs, and a transmission unit configured to transmit the generated metadata.

The transmission apparatus according to the second aspect of the present technology can be an independent device or can be an internal block that constitutes one device. In addition, a transmission method according to the second aspect of the present technology is a transmission method corresponding to the above-described transmission apparatus according to the second aspect of the present technology.

According to the second aspect of the present technology, there is provided a transmission method executed by a transmission apparatus, the method including generating, by the transmission apparatus, metadata including a specific invoking name in using a universal invoking name and association information in a voice AI assistance service in cooperation with content, the universal invoking name being common to a plurality of programs that perform processing corresponding to a voice uttered by the viewer watching the content as an invoking name used for invoking the program, the association information being associated with the specific invoking name to each of the programs, and transmitting, by the transmission apparatus, the generated metadata.

An information processing apparatus according to a third aspect of the present technology includes a processing unit configured to generate a personalized program specialized for a viewer watching content in using a voice AI assistance service in cooperation with content on the basis of generation information including at least account information of the viewer, a name of the program performing processing corresponding to a voice uttered by the viewer, and an invoking name used for invoking the personalized program, in which the processing unit updates the personalized program being generated on the basis of update information including at least the account information, the name of the personalized program, and registration information excluding the invoking name, the registration information being information registered for the personalized program.

The information processing apparatus according to the third aspect of the present technology can be an independent device or can be an internal block that constitutes one device. In addition, an information processing method according to the third aspect of the present technology is an information processing method corresponding to the above-described information processing apparatus according to the third aspect of the present technology.

According to the third aspect of the present technology, there is provided an information processing method executed by an information processing apparatus, the method including: generating, by the information processing apparatus, a personalized program specialized for a viewer watching content in using a voice AI assistance service in cooperation with content on the basis of generation information including at least account information of the viewer, a name of the program performing processing corresponding to a voice uttered by the viewer, and an invoking name used for invoking the personalized program, in which the personalized program being generated is updated on the basis of update information including at least the account information, the name of the personalized program, and registration information excluding the invoking name, the registration information being information registered for the personalized program.

Effects of the Invention

According to the first to third aspects of the present technology, it is possible to improve the convenience of the voice AI assistance service used in cooperation with the content.

Note that the advantageous effects described here are not necessarily limiting and any advantageous effect described in the present disclosure may be obtained.

BRIEF DESCRIPTION OF DRAWINGS

FIG. 10 is a diagram illustrating an example of a description of invocation name metadata.

FIG. 16 is a diagram illustrating an example of a merge of context metadata.

FIG. 23 is a diagram illustrating an example of a description of skill registration information metadata.

MODE FOR CARRYING OUT THE INVENTION

Embodiments of the present technology are now described with reference to the drawings. Note that the description is given in the following order.

1. Configuration of system
2. Embodiments of the present technology
   (1) First embodiment: configuration to replace invocation names on local side
   (2) Second embodiment: configuration to switch target skills using alias skills on cloud side
   (3) Third embodiment: configuration to generate or update private skills 3. Modifications
4. Configuration of computer 1. Configuration of System Configuration of Content-Voice AI Cooperation System FIG. 1 is a block diagram illustrating an example of the configuration of an embodiment of a content-voice AI cooperation system to which the present technology is applied.

The content-voice AI cooperation system 1 is a system for delivering content and allows the use of a voice AI assistance service in cooperation with the delivered content.

Figure 1:
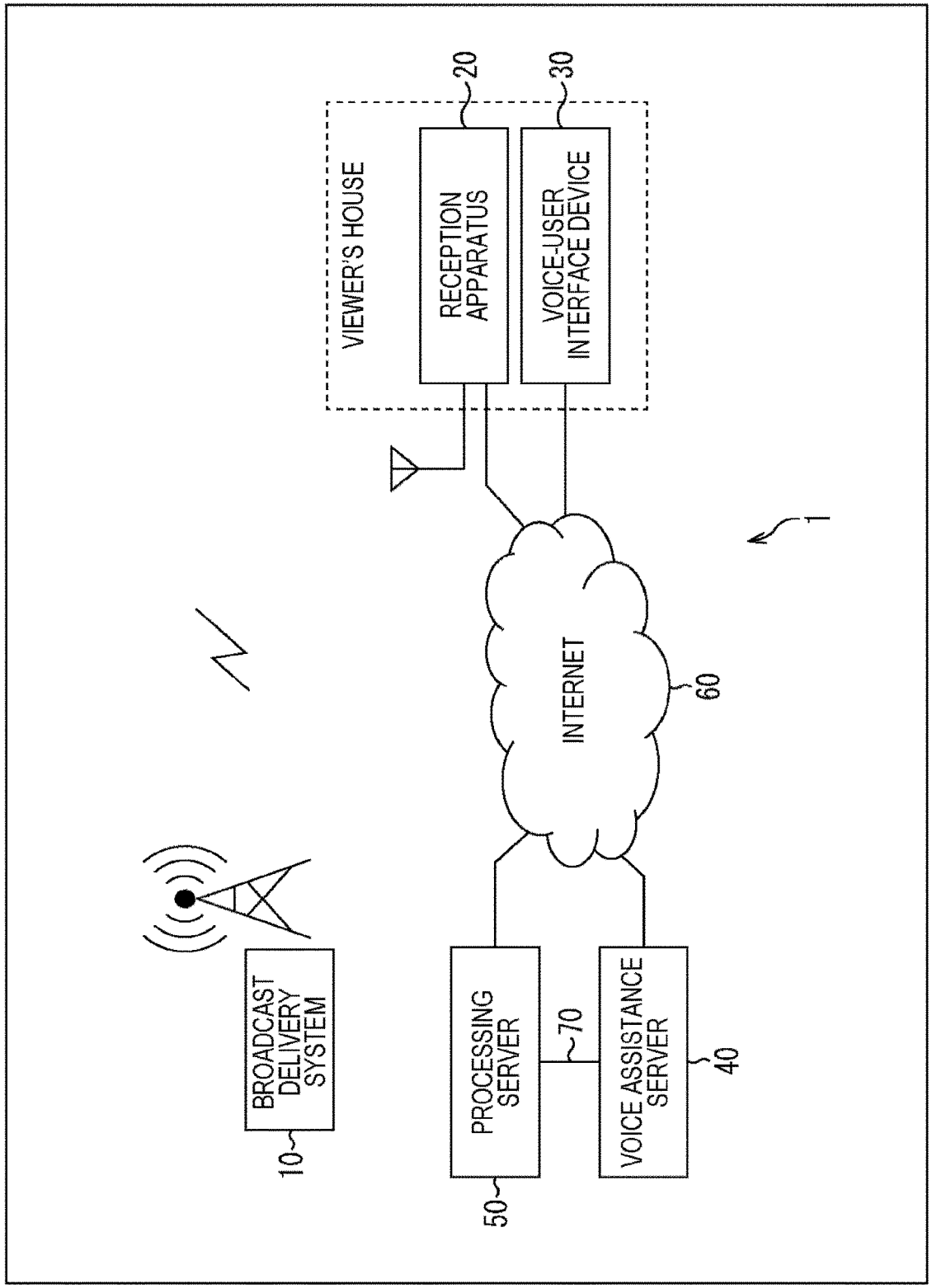
FIG. 1 is a block diagram illustrating an example of a configuration of an embodiment of a content-voice AI cooperation system to which the present technology is applied.

In FIG. 1, the content-voice AI cooperation system 1 includes a broadcast delivery system 10, a reception apparatus 20, a voice-user interface device 30, a voice assistance server 40, and a processing server 50.

Further, in the content-voice AI cooperation system 1, the reception apparatus 20 and the voice-user interface device 30 installed in a viewer's house are capable of being connected to various servers such as the voice assistance server 40 and the processing server 50 installed in a data center or the like via the Internet 60 for exchanging various data.

The broadcast delivery system 10 includes one or a plurality of broadcast servers or the like. The broadcast delivery system 10 performs necessary processing on the content to be delivered and sends out a resultant broadcast signal (broadcast wave) obtained by the processing from a transmission antenna installed at a transmitting station.

The reception apparatus 20 is configured, for example, as a fixed receiver such as television sets and personal computers or as a mobile receiver such as smartphones, cellular phones, and tablet computers. The reception apparatus 20 receives and processes the broadcast signal transmitted from the broadcast delivery system 10 and plays back the delivered content (e.g., such as broadcast programs or ADs).

The voice-user interface device 30 is, for example, a voice processing device (e.g., a speaker) capable of performing wireless communication such as Bluetooth (registered trademark), wireless local area network (LAN), and cellular communication or wired communication, which is also called a smart speaker or a home agent, for example. This type of speaker is capable of, in addition to playing music, functioning as, for example, a user interface for a voice AI assistance service, or performing voice operations on an instrument such as lighting equipment or air conditioning equipment.

The voice-user interface device 30 is capable of providing a voice AI assistance service for the end-user (a viewer of content) in cooperation with a server, such as the voice assistance server 40 on the cloud side. In this description, the voice AI assistance service is, for example, a function or a service that appropriately answers or operates in response to an end-user's question or request in combination with processing such as voice recognition or natural language analysis.

The voice assistance server 40 has a function of providing voice AI assistance services, various databases, and the like. The voice assistance server 40 performs processing of providing the voice AI assistance service in response to a request from the voice-user interface device 30 and replies to the voice-user interface device 30 with the processing result (a response) via the Internet 60.

The processing server 50 cooperates with the voice assistance server 40 to perform the processing of providing the voice AI assistance service, and transmits the processing result (a response) to the voice assistance server 40 via the Internet 60 or a network 70 (e.g., a communication line such as leased lines). Moreover, the processing result obtained by the processing server 50 can be transmitted not only to the voice assistance server 40 but also to the reception apparatus 20 or the voice-user interface device 30 via the Internet 60.

In the content-voice AI cooperation system 1 configured as described above, a program called a skill is executed to enable the use of the voice AI assistance service in cooperation with the content.

In this description, the skill includes information such as what kind of voice to respond to, what function to use with what word as a parameter, or what processing server (processing program) actually executes the function. In addition, the skill is a program (a computer program) used to perform processing corresponding to the voice transmitted from the voice-user interface device 30 on the basis of the above-mentioned information.

Further, the invoking name used to invoke a skill is referred to as an invocation name. In other words, the end-user (a viewer who watches content) is necessary to utter an invocation name upon using the skill.

In a case where a plurality of broadcast stations operates skills using the voice AI assistance service, the invocation name used to activate the skills, however, is different for each broadcast station (or each broadcast program or the like). For example, FIGS. 2 to 4 show detailed examples in the case where the invocation name is different for each broadcast station or broadcast program.

Figure 2:
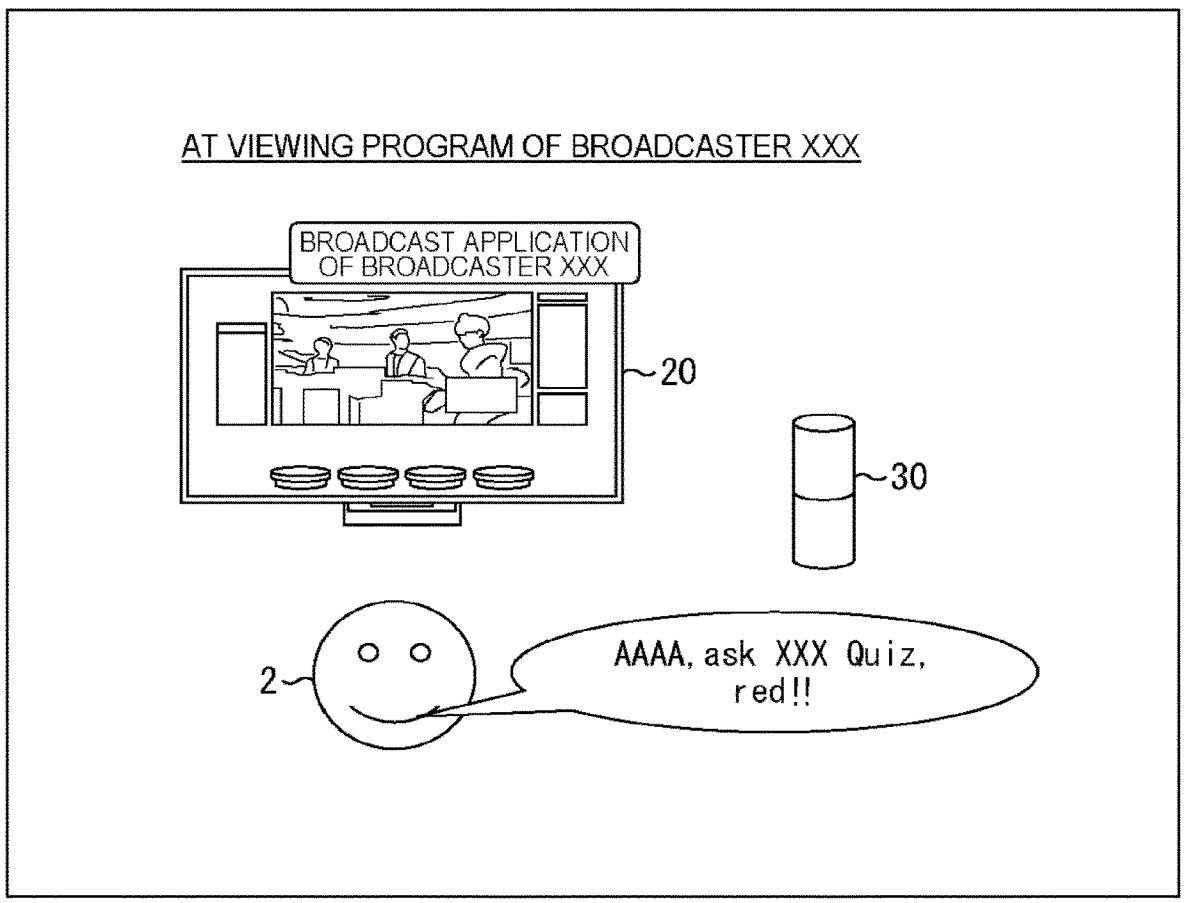
FIG. 2 is a diagram illustrating a first example of an invocation name for each broadcast station or broadcast program.

FIG. 2 shows a scene in which a viewer 2, when starting the reception apparatus 20 and viewing a quiz program of a broadcaster XXX (a broadcast station XXX), uses the skills for this quiz program. In this scene, the viewer 2 utters, for example, "AAAA, ask XXX Quiz, red!!" to the voice-user interface device 30, and is able to participate in the quiz program by telling the viewer's own answer for the given quiz (the alternative quiz using buttons of blue, red, green, and yellow).

Figure 3:
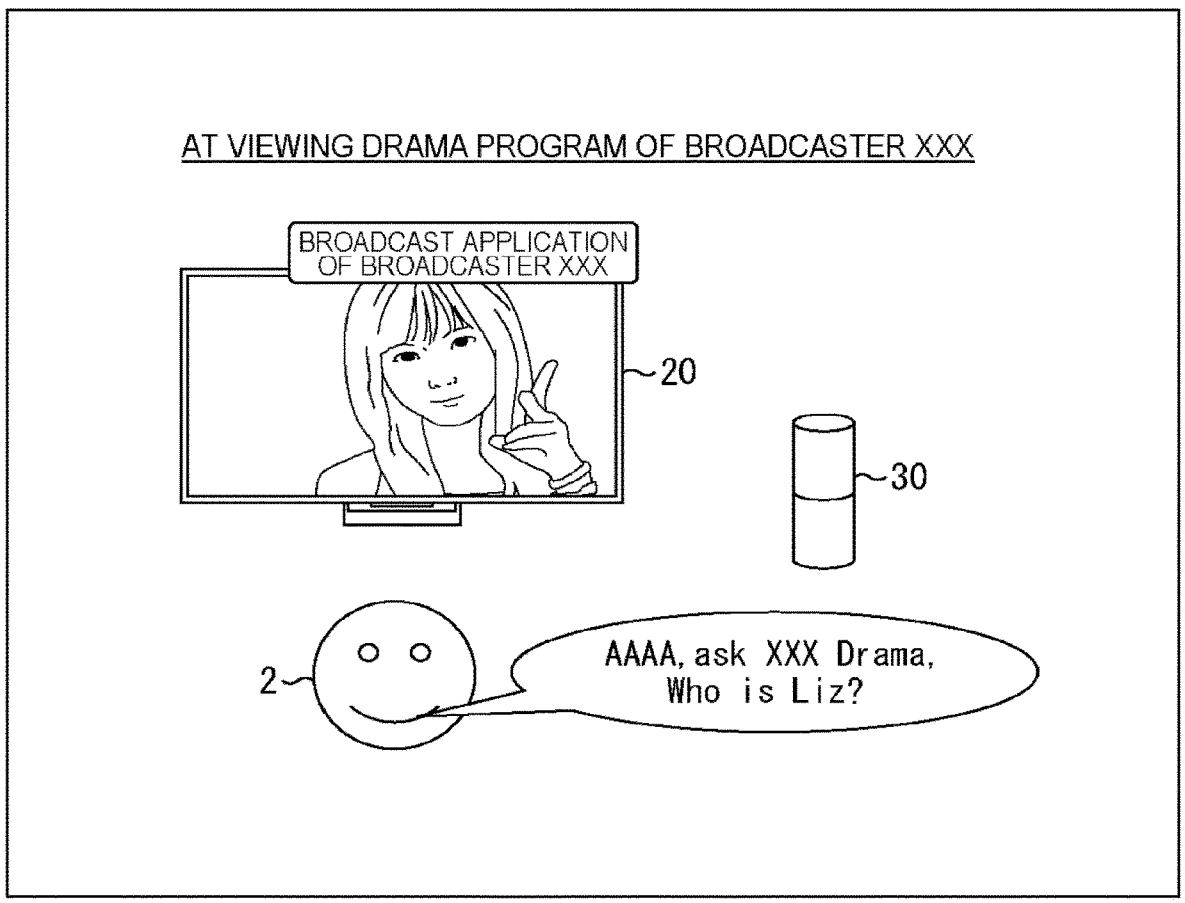
FIG. 3 is a diagram illustrating a second example of an invocation name for each broadcast station or broadcast program.

FIG. 3 shows a scene in which the viewer 2 uses the skills for a drama program of the broadcaster XXX while viewing the drama program. In this scene, the viewer 2 utters a question, for example, "AAAA, ask XXX Drama, Who is Liz?" about the contents of the drama program to the voice-user interface device 30, and then it is possible to obtain the answer.

Figure 4:
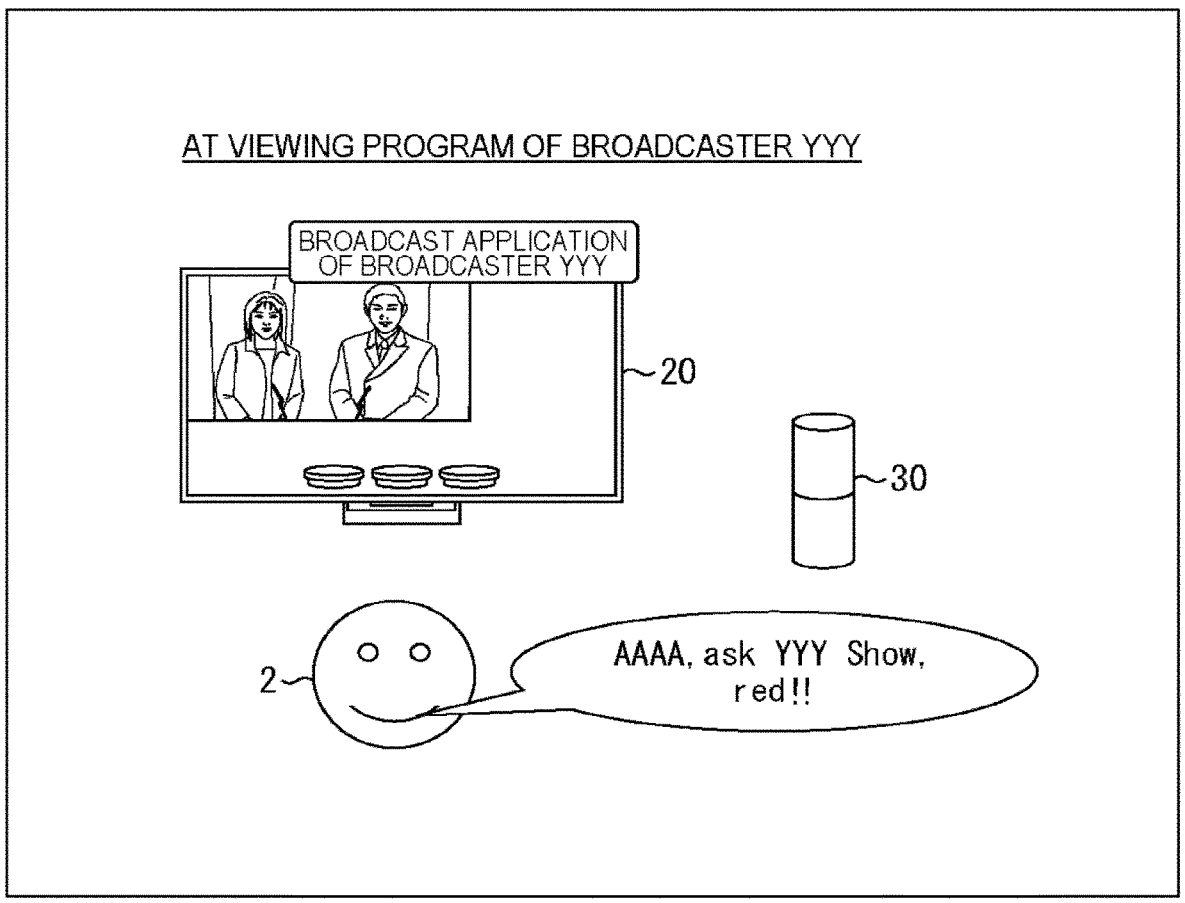
FIG. 4 is a diagram illustrating a third example of an invocation name for each broadcast station or broadcast program.

FIG. 4 shows a scene in which the viewer 2, when watching the information program of a broadcaster YYY (a broadcast station YYY), uses the skills for the information program. In this scene, the viewer 2 is able to participate in the information program by uttering, for example, "AAAA, ask YYY Show, red!" to the voice-user interface device 30 and answering a game, voting for a questionnaire, or the like.

As described above, the viewer 2 is sufficient to utter "XXX Quiz" as an invocation name when viewing a quiz program of the broadcaster XXX, but the viewer 2 is necessary to utter "XXX Drama" when viewing a drama program of the broadcaster XXX and to utter "YYY Show" when viewing the information program of the broadcaster YYY.

In other words, in such an environment, the viewer 2 is necessary to recall invocation names of all the skills for each broadcast station or broadcast program, to grasp which program of which station at which time the program is being viewed at that time and to utter the invocation names by switching them. This leads to the possibility of compromising convenience (the usability will become worse).

Further, regarding the skills operated by one broadcast station, necessary utterances or intents differ for each broadcast program or broadcast-accompanying application, so it is difficult to operate it with only one skill that supports all of them. For example, it is assumed that the operation varies dynamically by dividing the skills in accordance with a particular criterion for each program or genre.

Thus, there is a demand for viewers to be able to interact with each skill using only one invocation name without being aware of skill differences between broadcast stations (or specific criteria such as programs and genres), dynamic change in skills, and the like. This makes it possible to improve the convenience of a voice AI assistance service used in cooperation with content such as broadcast programs.

Thus, the present technology allows a viewer to utter one invocation name to interact with the desired skill, which makes it possible to improve the convenience of a voice AI assistance service used in cooperation with content such as broadcast programs. First to third embodiments as modes of the present technology are now described.

Moreover, as invocation names, a universal invoking name for a plurality of skills and a specific invoking name for each skill are described herein. Thus, the former is hereinafter referred to as a universal invocation name and the latter is referred to as an operational invocation name to distinguish them. In addition, for example, an alias skill and a receiver operating skill described later are used as invocation names, but unless there is a particular need to distinguish them, they are simply referred to as an invocation name.

2. Embodiments of the Present Technology (1) First Embodiment

The configuration in which the reception apparatus 20 and the voice-user interface device 30 on the local side perform replacement communication for invocation names to replace the invocation name included in the utterance of the viewer 2 is now described as the first embodiment with reference to FIGS. 5 to 10.

First Example of Configuration

Figure 5:
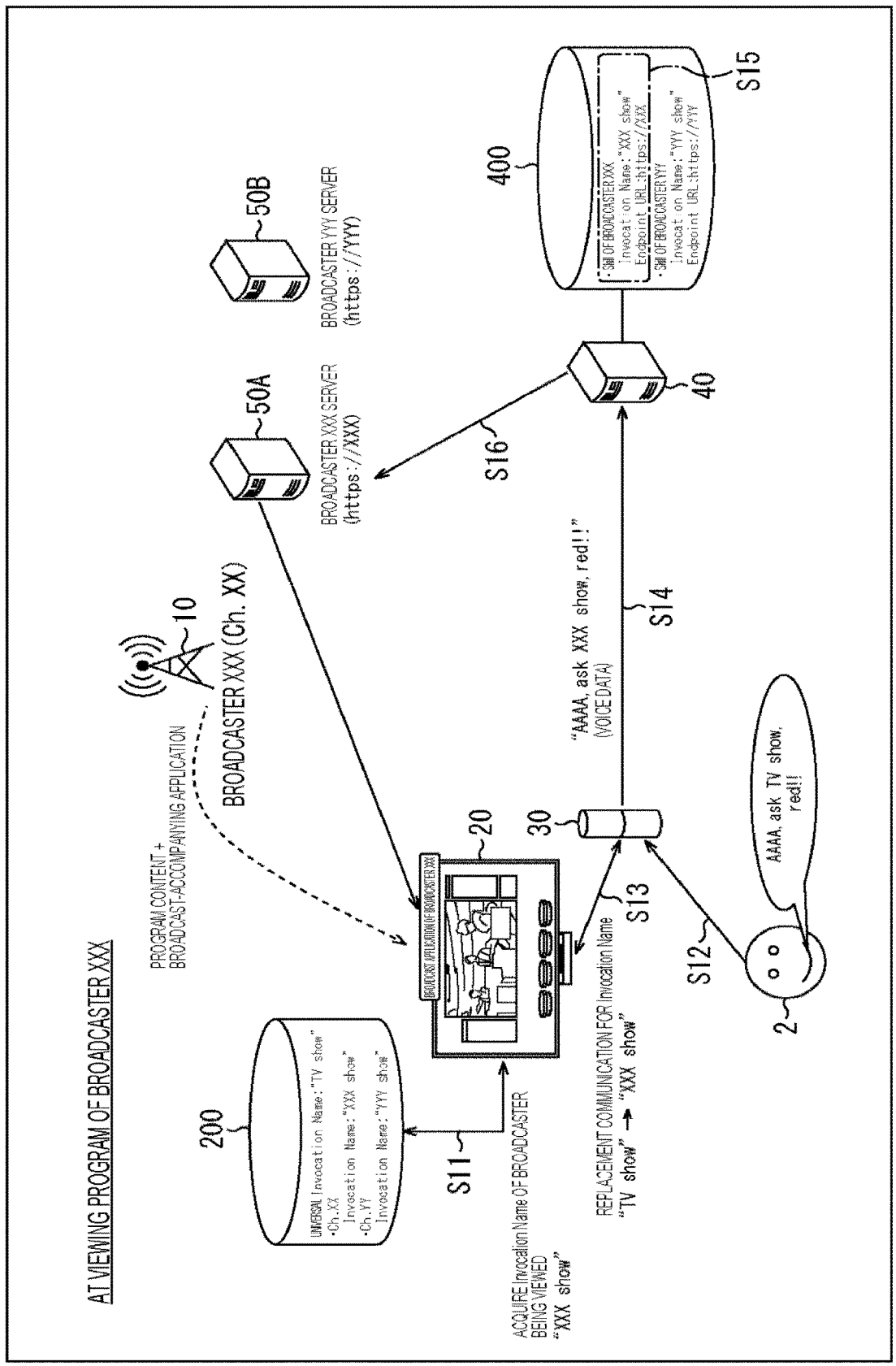
FIG. 5 is a diagram illustrating a first example of the configuration of a first embodiment.

FIG. 5 is a diagram illustrating a first example of a configuration of the first embodiment.

In FIG. 5, the reception apparatus 20 receives a broadcast signal transmitted from the broadcast delivery system 10, and then plays back content such as a broadcast program or executes a broadcast-accompanying application. In addition, the reception apparatus 20 records a registration list (invocation name list) in a recording unit 200 included therein.

This registration list includes association information in which a universal invocation name, which is an invoking name common to a plurality of skills, and an operational invocation name for invoking a skill operated by each broadcast station or the like are associated with each other. In the example of FIG. 5, the operational invocation name "XXX show" of the broadcaster XXX is associated with the operational invocation name "YYY show" of the broadcaster YYY for the universal invocation name "TV show".

For example, when the viewer 2 is watching the quiz program of the broadcaster XXX, the reception apparatus 20 is executing the broadcast-accompanying application of the broadcaster XXX in conjunction with the quiz program of the broadcaster XXX. In addition, in this case, the reception apparatus 20 acquires the operational invocation name "XXX show" from the registration list in conformity to the broadcaster XXX being viewed (S11).

In this description, the first example assumes that the viewer 2 uses the skills provided by the broadcaster XXX to participate in the quiz program of the broadcaster XXX being viewed. In this case, the viewer 2 utters, for example, "AAAA, ask TV show, red!!" to the voice-user interface device 30 and tells the viewer's own answer for the given quiz (an alternative quiz using buttons of blue, red, green, and yellow) (S12).

In the utterance "AAAA, ask TV show, red!!", the first word "AAAA" is called a wake word. For example, the voice-user interface device 30 on the local side, when detecting this word, starts the communication with the server on the cloud side, and then the subsequent words are sent to the server as voice data.

Further, the next word "ask" is called a launch phrase, and it tells the server on the cloud side that the following word is a skill name, that is, an invocation name. In this example, the viewer 2 utters the universal invocation name "TV show" following the launch phrase "ask". Furthermore, the following word "red" is an answer to the quiz and is a parameter that is passed to a target skill.

In this case, the voice-user interface device 30 performs wireless communication with the reception apparatus 20 to replace the invocation name from "TV show" to "XXX show" (S13). Then, the voice-user interface device 30 transmits voice data of the utterance "AAAA, ask XXX show, red!!", after replacing the invocation name, to the voice assistance server 40 via the Internet 60 (S14).

In this way, the reception apparatus 20 records in advance association information in which the universal invocation name and the operational invocation name are associated with each other as the registration list. In addition, the reception apparatus 20 makes a preset for the voice-user interface device 30, upon detecting the universal invocation name (e.g., "TV show") from the utterance spoken by the viewer 2, so that the communication for replacing the invocation name with itself is performed.

Then, in a case where the voice-user interface device 30 issues a request for replacing an invocation name, the reception apparatus 20 replaces the universal invocation with the operational invocation name acquired from the registration list (an invocation name of a viewing channel) and replies to the voice-user interface device 30. This makes it possible for the voice-user interface device 30 to transmit the voice data of the utterance in which the universal invocation name is replaced with the operational invocation name to the voice assistance server 40.

Figure 25:
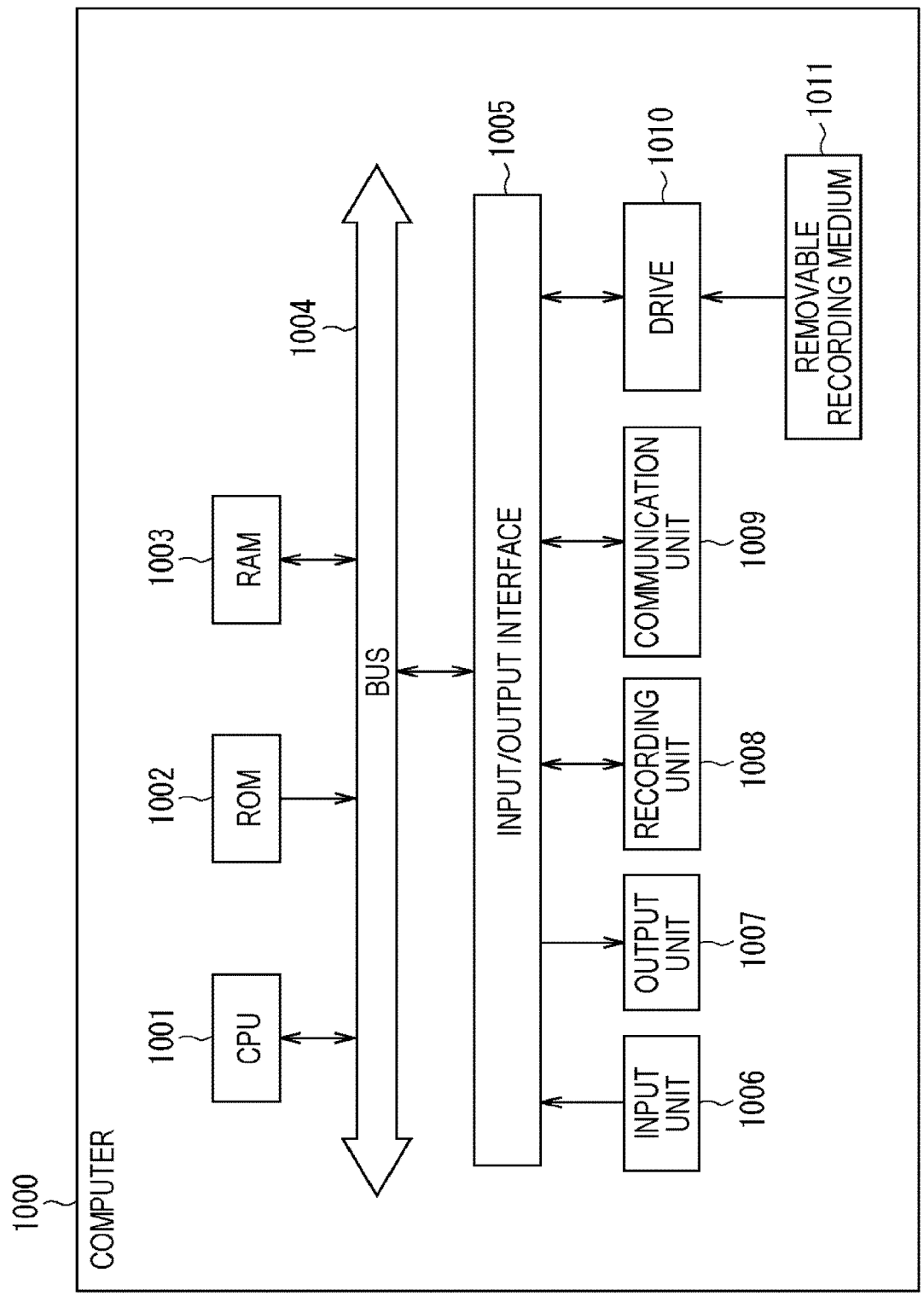
FIG. 25 is a diagram illustrating an example of the configuration of a computer.

The voice assistance server 40 records a plurality of skills in a recording unit 400 included therein, which allows the skills to be executed by a CPU (such as a CPU 1001 in FIG. 25 described later). In the example of FIG. 5, the operational invocation name "XXX show" and the endpoint uniform resource locator (URL) "https://XXX" are registered as the skill information of the broadcaster XXX. In addition, as the skill information of the broadcaster YYY, the operational invocation name "YYY show" and the endpoint URL "https://YYY" are registered.

The voice assistance server 40 converts the voice data of the utterance from the voice-user interface device 30 into text data and specifies a target skill from a plurality of skills (S15). In the example of FIG. 5, the text data of the utterance includes the operational invocation name "XXX show", so the skill of the broadcaster XXX is specified. Then, for example, the text data of the utterance is passed as a parameter to the skill executed in the broadcaster XXX. Moreover, as the parameter in this description, in addition to a part of the text data of the utterance can be passed, for example, all of the text data or other information can be passed.

In this example, the URL "https://XXX", that is, the URL of a broadcaster XXX server 50A is set as the endpoint URL of the skill of the broadcaster XXX, so the skill of the broadcaster XXX executed in the voice assistance server 40 notifies the broadcaster XXX server 50A of a request message. Thus, the skill of the broadcaster XXX (e.g., the processing on an answer for the quiz, "red") is executed and the processing result is presented (S16).

As a method of presenting this processing result, various presentation methods are assumed depending on its operation, but for example, the following presentation methods can be employed. In other words, the skill of the broadcaster XXX executed in the broadcaster XXX server 50A is in cooperation with the broadcast-accompanying application of the broadcaster XXX executed in the reception apparatus 20 on the local side. Then, the processing result is incorporated in contents presented by the broadcast-accompanying application, or the processing result from the broadcaster XXX server 50A is notified to the voice-user interface device 30 on the local side via the voice assistance server 40, thereby making it possible to be output as a response voice.

In this way, the viewer 2 is able to participate in the quiz program being viewed. Specifically, in this example, when the viewer 2 uses the skill provided by the broadcaster XXX, it is sufficient for the viewer 2 to speak to the voice-user interface device 30 about the universal invocation name "TV show". Thus, it is possible for the viewer to interact with the skill provided by each broadcast station (or a particular criterion such as program or genre) with only one invocation name.

Second Example of Configuration

Figure 6:
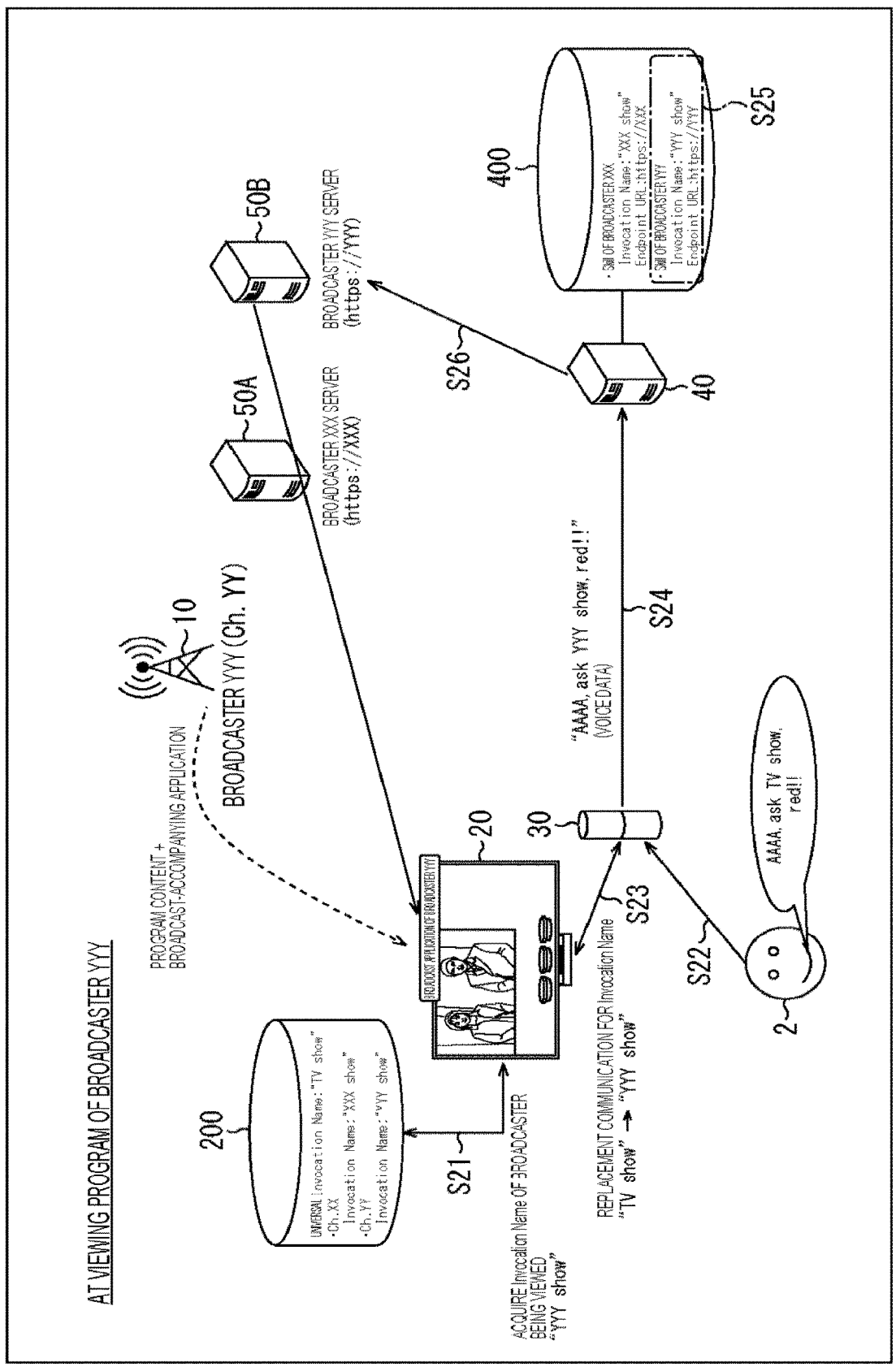
FIG. 6 is a diagram illustrating a second example of the configuration of the first embodiment.

FIG. 6 is a diagram illustrating a second example of a configuration of the first embodiment.

In FIG. 6, the reception apparatus 20 has a registration list, recorded therein, including association information in which the universal invocation name and the operational invocation name are associated with each other, which is similar to FIG. 5.

Further, in FIG. 6, for example, when the viewer 2 is watching the information program of the broadcaster YYY, the reception apparatus 20 is executing the broadcast-accompanying application of the broadcaster YYY in conjunction with the information program of the broadcaster YYY. In addition, in this case, the reception apparatus 20 acquires the operational invocation name "YYY show" from the registration list in conformity to the broadcaster YYY being viewed (S21).

In this description, the second example assumes that the viewer 2 uses the skills provided by the broadcaster YYY to participate in the information program of the broadcaster YYY being viewed. In this regard, the viewer 2 utters, for example, "AAAA, ask TV show, red!!" to the voice-user interface device 30 and, for example, replies to the game with an answer, votes on a questionnaire, or the like (S22).

In this second example, the viewer 2 utters the universal invocation name "TV show" following the launch phrase "ask". Furthermore, the following word "red" is a reply to the game or the like and is a parameter that is passed to a target skill.

In this case, the voice-user interface device 30 performs wireless communication with the reception apparatus 20 to replace the invocation name from "TV show" to "YYY show" (S23). Then, the voice-user interface device 30 transmits voice data of the utterance "AAAA, ask YYY show, red!!", after replacing the invocation name, to the voice assistance server 40 via the Internet 60 (S24). In other words, the voice-user interface device 30 transmits the voice data of the utterance in which the universal invocation name is replaced with the operational invocation name to the voice assistance server 40.

The voice assistance server 40 records a plurality of skills, which is similar to FIG. 5. The voice assistance server 40 converts the voice data of the utterance from the voice-user interface device 30 into text data and specifies a target skill from a plurality of skills (S25). In the example of FIG. 6, the voice data of the utterance includes the operational invocation name "YYY show", so the skill of the broadcaster YYY is specified and a parameter (text data of the utterance) is passed to the skill executed in the broadcaster YYY.

In this example, the URL "https://YYY", that is, the URL of a broadcaster YYY server 50B is set as the endpoint URL of the skill of the broadcaster YYY, so the voice assistance server 40 notifies the broadcaster YYY server 50B of a request message. Thus, the skill of the broadcaster YYY (e.g., the processing on a reply or the like for the game, "red") is processed and the processing result is presented (S26). In this event, for example, the skill of the broadcaster YYY is capable of cooperating with the broadcast-accompanying application of the broadcaster YYY to incorporate the processing result in the contents presented by the broadcast-accompanying application, as described above.

In this way, the viewer 2 is able to participate in the information program being viewed. Specifically, in this example, when the viewer 2 uses the skill provided by the broadcaster YYY, it is sufficient for the viewer 2 to speak to the voice-user interface device 30 about the universal invocation name "TV show". Thus, it is possible for the viewer to interact with the skill provided for each broadcast station (or a particular criterion such as program) with only one invocation name.

More specifically, comparing the second example illustrated in FIG. 6 with the first example illustrated in FIG. 5, the skills used by the broadcaster YYY are different from the skills used by the broadcaster XXX, but both viewers 2 are able to use the desired skill by uttering the universal invocation name "TV show".

Third Example of Configuration

Figure 7:
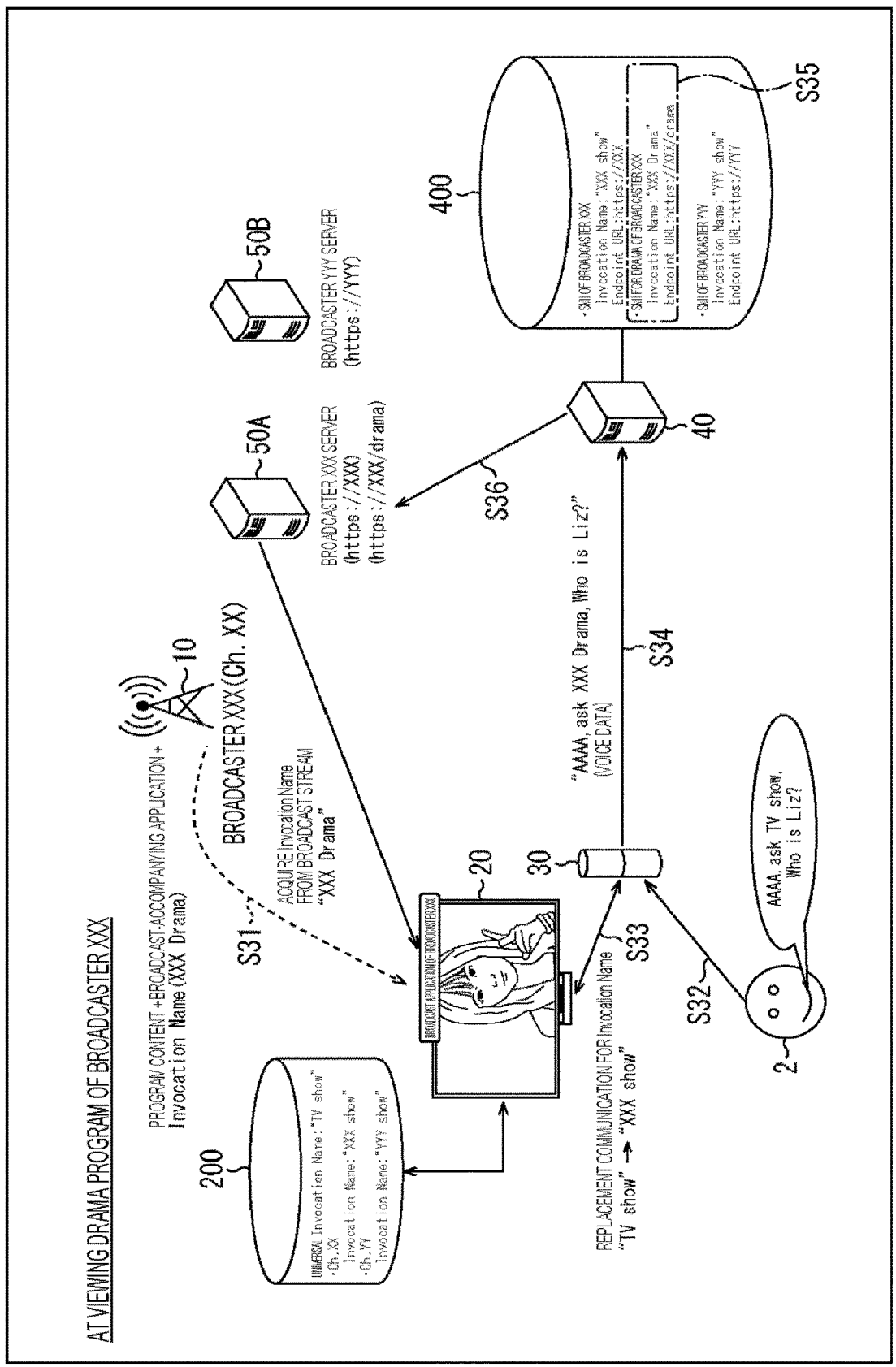
FIG. 7 is a diagram illustrating a third example of the configuration of the first embodiment.

FIG. 7 is a diagram illustrating a third example of a configuration of the first embodiment.

In FIG. 7, the reception apparatus 20 receives a broadcast signal transmitted from the broadcast delivery system 10, and then plays back content such as a broadcast program or executes a broadcast-accompanying application. The broadcast stream has metadata, inserted therein, used for notifying of an operational invocation name of the dynamically changing skill (hereinafter, also referred to as "invocation name metadata").

Moreover, as will be described later in detail, it is possible to send the invocation name metadata by using an element EventStream or the like of a media presentation description (MPD). In addition, in this third example, the operational invocation name for invoking the skill of the drama program of the broadcaster XXX is unregistered in the registration list recorded in the recording unit 200.

For example, in a case where the viewer 2 is watching the drama program of the broadcaster XXX, the reception apparatus 20 executes the broadcast-accompanying application of the broadcaster XXX in conformity to the drama program of the broadcaster XXX. In addition, in this event, the reception apparatus 20 extracts the invocation name metadata from the broadcast stream in accordance with the drama program of the broadcaster XXX being viewed and acquires the operational invocation name "XXX Drama" from the extracted metadata (S31).

In this regard, the third example assumes that the viewer 2 uses the skill for a drama program provided by the broadcaster XXX to ask a question about the contents of the drama program. In this example, the viewer 2 utters, for example, "AAAA, ask TV show, Who is Liz?" to the voice-user interface device 30 to ask a question about the contents of the drama program (S32).

In this third example, the viewer 2 utters the universal invocation name "TV show" following the launch phrase "ask". Furthermore, the following utterance "Who is Liz?" is a question about the contents of the drama program and is a parameter passed to the target skill.

In this case, the voice-user interface device 30 performs wireless communication with the reception apparatus 20 to replace the invocation name from "TV show" to "XXX Drama" (S33). Then, the voice-user interface device 30 transmits voice data of the utterance "AAAA, ask XXX Drama, Who is Liz?", after replacing the invocation name, to the voice assistance server 40 via the Internet 60 (S34).

In this way, in a case where there is a dynamic change in skills, the broadcast stream has the invocation name metadata, inserted therein, including the operational invocation name of the skill assumed to be currently used. Thus, the reception apparatus 20 acquires the operational invocation name (acquires in advance) and makes a preset for the voice-user interface device 30, upon detecting the universal invocation name from the utterance spoken by the viewer 2, so that the communication for replacing the own invocation name with itself is performed.

Then, in a case where the voice-user interface device 30 issues a request for replacing an invocation name, the reception apparatus 20 replaces the universal invocation with the operational invocation name acquired from the invocation name metadata (an invocation name of a viewing channel) and replies to the voice-user interface device 30. This makes it possible for the voice-user interface device 30 to transmit the voice data of the utterance in which the universal invocation name is replaced with the operational invocation name to the voice assistance server 40.

The voice assistance server 40 records a plurality of skills in the recording unit 400. However, in the example of FIG. 7, the operational invocation name "XXX Drama" and the endpoint URL "https://XXX/drama" are registered as the information regarding the skills for the drama program of the broadcaster XXX, in addition to information regarding the skill information of the broadcaster XXX and the skill of the broadcaster YYY.

The voice assistance server 40 converts the voice data of the utterance from the voice-user interface device 30 into text data and specifies a target skill among the plurality of skills (S35). In the example of FIG. 7, the voice data of the utterance includes the operational invocation name "XXX Drama", so the skill for the drama program of the broadcaster XXX is specified. Then, the parameter (text data of the utterance) is passed to the skill for the drama program running in the broadcaster XXX.

In this example, the URL "https://XXX/drama" is set as the endpoint URL of the skill for the drama program of the broadcaster XXX, so the voice assistance server 40 notifies the broadcaster XXX server 50A of a request message. Thus, the processing for the skill for the drama program of the broadcaster XXX (e.g., the processing on the question "Who is Liz?") is performed and then the processing result is notified (S36).

In this case, for example, the skill for the drama program of the broadcaster XXX is in cooperation with the broadcast-accompanying application of the broadcaster XXX. Thus, as described above, it is possible to incorporate the processing result on the contents presented by the broadcast-accompanying application in the reception apparatus 20 on the local side (e.g., makes an answer to a question) or to output a response voice corresponding to the processing result (e.g., outputs an answer as a voice to the question) from the voice-user interface device 30 on the local side.

In this way, the viewer 2 is able to obtain information regarding the contents of the drama program being viewed. Specifically, in this example, when the viewer 2 uses the skill of the drama program of the broadcaster XXX, it is sufficient for the viewer 2 to speak to the voice-user interface device 30 about the universal invocation name "TV show". Thus, it is possible for the viewer to interact with the skill provided for each broadcast station (or a particular criterion such as program) with only one invocation name.

More specifically, comparing the third example illustrated in FIG. 7 with the first example illustrated in FIG. 5 and the second example illustrated in FIG. 6, the skills of the drama program used by the broadcaster XXX are different from the skills used by the broadcaster XXX and the skills used by the broadcaster YYY, but both viewers 2 are able to use the desired skill by uttering the universal invocation name "TV show".

Example of Detailed Configuration of Each Device

Figure 8:
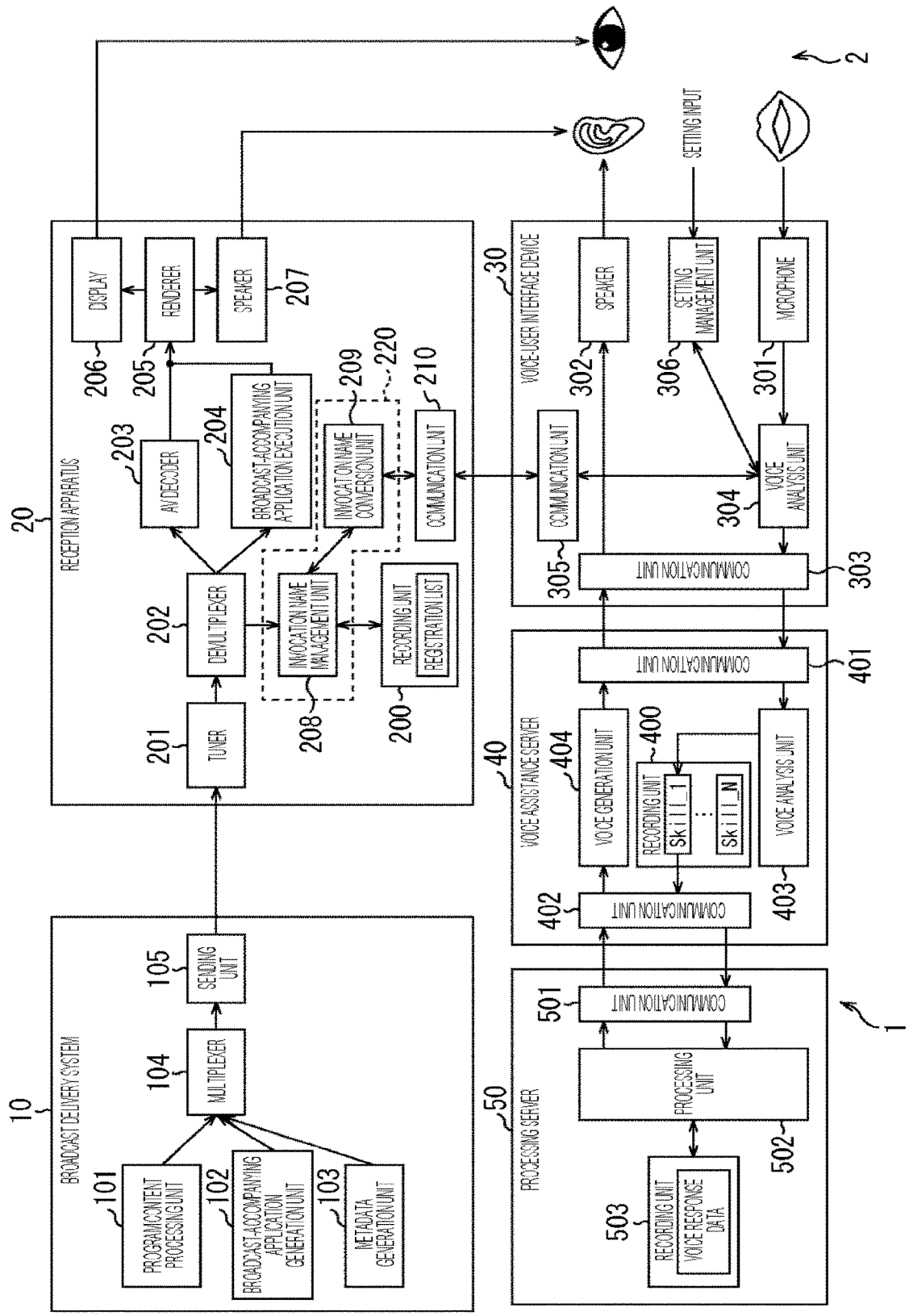
FIG. 8 is a block diagram illustrating an example of a detailed configuration of each device according to the first embodiment.

FIG. 8 is a block diagram illustrating an example of a detailed configuration of each device according to the first embodiment.

FIG. 8 shows an example of the configurations of the broadcast delivery system 10 provided on the broadcast station side (transmission side) and the reception apparatus 20 provided on the local side (reception side). In addition, FIG. 8 shows an example of the configuration of the voice-user interface device 30 provided on the local side and the configurations of the voice assistance server 40 and the processing server 50 provided on the cloud side.

In FIG. 8, the broadcast delivery system 10 includes a program content processing unit 101, a broadcast-accompanying application generation unit 102, a metadata generation unit 103, a multiplexer 104, and a sending unit 105.

The program content processing unit 101 performs necessary processing (e.g., such as AV encoding) on the content input therein and supplies the result to the multiplexer 104. Moreover, the content is, for example, a broadcast program, advertising, or the like and is acquired from an external server, a camera, a recording medium, or the like.

The broadcast-accompanying application generation unit 102 generates a broadcast-accompanying application and supplies it to the multiplexer 104. In this description, the broadcast-accompanying application is an application executed in conjunction with the content such as broadcast programs.

The metadata generation unit 103 generates the invocation name metadata in the case where there is a dynamic change in skills (e.g., the case of the third example illustrated in FIG. 7) and supplies it to the multiplexer 104. In this description, the invocation name metadata is metadata used for notifying of the operational invocation name of the dynamically changing skill.

The multiplexer 104 multiplexes the content supplied from the program content processing unit 101 and the broadcast-accompanying application supplied from the broadcast-accompanying application generation unit 102 and supplies the resulting stream to the sending unit 105. In addition, in the case where there is a dynamic change in skills, the multiplexer 104 multiplexes the invocation name metadata, together with the content and the broadcast-accompanying application, and supplies the resulting stream to the sending unit 105.

The sending unit 105 performs necessary processing (e.g., such as error correction coding or modulation processing) on the stream supplied from the multiplexer 104, and transmits the resulting broadcast signal (broadcast stream) through a transmitting antenna installed at a transmitting station.

In FIG. 8, the reception apparatus 20 includes a tuner 201, a demultiplexer 202, an AV decoder 203, a broadcast-accompanying application execution unit 204, a renderer 205, a display 206, a speaker 207, an invocation name management unit 208, an invocation name conversion unit 209, and a communication unit 210, in addition to the recording unit 200 (FIGS. 5 to 7)

The tuner 201 receives a broadcast signal (broadcast stream) transmitted from the broadcast delivery system 10 through a receiving antenna installed in a viewer's house or the like, performs necessary processing (e.g., such as demodulation processing or error correction decoding) on it, and supplies the resulting stream to the demultiplexer 202.

The demultiplexer 202 separates the stream supplied from the tuner 201 into streams of video, audio, and broadcast-accompanying application. The demultiplexer 202 supplies the video and audio streams to the AV decoder 203 and supplies the broadcast-accompanying application stream to the broadcast-accompanying application execution unit 204.

The AV decoder 203 decodes the video stream supplied from the demultiplexer 202 and supplies the result to the renderer 205. In addition, the AV decoder 203 also decodes the audio stream supplied from the demultiplexer 202 and supplies the result to the renderer 205.

The renderer 205 performs rendering on the video data supplied from the AV decoder 203 and causes the resulting video to be displayed on the display 206 such as a liquid crystal display (LCD) or organic light-emitting diode (OLED).

Further, the renderer 205 performs rendering on the voice data supplied from the AV decoder 203 and outputs the resulting audio through the speaker 207. This allows, in the reception apparatus 20, the video of the content such as the broadcast program to be displayed on the display 206 and the audio synchronized with the video to be output through the speaker 207.

The broadcast-accompanying application execution unit 204 is, for example, a browser compatible with hypertext markup language 5 (HTML5), JavaScript (registered trademark), or the like. The broadcast-accompanying application execution unit 204 executes the broadcast-accompanying application on the basis of the application data supplied from the demultiplexer 202 and supplies the video data to the renderer 205.

The renderer 205 performs rendering on the video data supplied from the broadcast-accompanying application execution unit 204 and causes the resulting video to be displayed on the display 206. This allows, in the reception apparatus 20, the video of the broadcast-accompanying application that is in conjunction with the content such as the broadcast program to be displayed on the display 206.

The invocation name management unit 208 manages an invocation name. The invocation name conversion unit 209 acquires the operational invocation name by querying the invocation name management unit 208. The invocation name conversion unit 209 replaces the universal invocation name sent from the voice-user interface device 30 with the operational invocation name acquired from the invocation name management unit 208.

In this case, the operational invocation name (an invocation name of a viewing channel) is replied from the invocation name management unit 208 to the invocation name conversion unit 209, but the acquisition route is different in the case where there is no dynamic change in skills and the case where there is a dynamic change in skills. In other words, in the case there is no dynamic change in skills, the invocation name management unit 208 acquires and replies with the operational invocation name from the registration list (an invocation name list) recorded in the recording unit 200 in response to an inquiry from the invocation name conversion unit 209.

On the other hand, in the case where there is a dynamic change in skills, the invocation name metadata is inserted in the broadcast stream in the broadcast delivery system 10, so the demultiplexer 222 extracts the invocation name metadata included in the stream from the tuner 201 and supplies it to the invocation name management unit 208. Then, the invocation name management unit 208 replies with the operational invocation name obtained from the invocation name metadata in response to the inquiry from the invocation name conversion unit 209.

Moreover, in the reception apparatus 20, processing modules such as the invocation name management unit 208 and the invocation name conversion unit 209 constitutes a processing unit 220 that performs processing relating to an invocation name. The processing unit 220 is implemented by, for example, a CPU (a CPU 1001 in FIG. 25 described later or the like) running a predetermined program (a computer program). In addition, the recording unit 200 is a semiconductor memory including a nonvolatile memory such as non-volatile RAM (NVRAM) or is a recording medium such as a hard disk drive (HDD), and various data can be recorded therein.

The communication unit 210 is configured, for example, as a communication module, which is compatible with wireless communication such as Bluetooth (registered trademark), wireless LAN, and cellular communication or wired communication. The communication unit 210 communicates with the voice-user interface device 30 (specifically, a communication unit 305 thereof) in accordance with a predetermined communication scheme to exchange various data.

In this description, the communication of replacing the invocation names as described above is performed between the communication unit 210 of the reception apparatus 20 and the communication unit 305 of the voice-user interface device 30. The communication unit 210 receives an invocation name replacement request transmitted from the communication unit 305 and supplies it to the invocation name conversion unit 209. Then, the communication unit 210 transmits the replaced operational invocation name supplied from the invocation name conversion unit 209 to the communication unit 305.

In FIG. 8, the voice-user interface device 30 includes a microphone 301, a speaker 302, a communication unit 303, a voice analysis unit 304, a communication unit 305, and a setting management unit 306.

The microphone 301 picks up the utterance of the viewer 2 and supplies the voice data of the utterance to the voice analysis unit 304.

The voice analysis unit 304 analyzes the voice utterance on the basis of the voice data of the utterance supplied from the microphone 301 and supplies the voice data of the utterance corresponding to the analysis result to the communication unit 303.

In other words, in the case where the viewer 2 utters the universal invocation, the voice analysis unit 304 issues an invocation name replacement request and supplies it to the communication unit 305. Then, the voice analysis unit 304 supplies, to the communication unit 303, the voice data acquired by replacing the universal invocation name part of the voice data of the utterance to be analyzed with the operational invocation name acquired by the replacement communication with the reception apparatus 20 through the communication unit 305.

The communication unit 303 transmits the voice data of the utterance supplied from the voice analysis unit 304 to the voice assistance server 40 via the Internet 60. In addition, the communication unit 303 receives the voice data as a response transmitted from the voice assistance server 40 via the Internet 60 and supplies it to the speaker 302.

The speaker 302 outputs the response voice on the basis of the voice data as a response supplied from the communication unit 303.

The communication unit 303 is configured as a communication module, which is compatible with wireless communication such as wireless LAN and cellular communication, or wired communication. In addition, the communication unit 305 is configured as a communication module, which is compatible with wireless communication such as Bluetooth (registered trademark), wireless LAN, and cellular communication or wired communication. Moreover, in FIG. 8, the communication unit 303 and the communication unit 305 are described as separate communication modules for the convenience of description, but they can be integrated into one communication module.

The setting management unit 306 makes various settings according to the setting input from the viewer 2. In this description, for example, the universal invocation name is set, or the communication destination when the invocation name replacement communication is performed upon detecting the universal invocation name from the utterance is set. Moreover, in this description, for example, the setting input can be received by the operation input of the viewer 2 with a button or a touch panel (not shown) or can be received the voice input of the viewer 2 with the microphone 301.

In FIG. 8, the voice assistance server 40 includes a communication unit 401, a communication unit 402, a voice analysis unit 403, and a voice generation unit 404, in addition to the recording unit 400 (see FIGS. 5 to 7).

The communication unit 401 receives the voice data of the utterance transmitted from the voice-user interface device 30 via the Internet 60 and supplies it to the voice analysis unit 403.

The voice analysis unit 403 analyzes the voice data of the utterance supplied from the communication unit 401 and converts the voice data of the utterance into text data. In addition, the voice analysis unit 403 specifies a target skill (e.g., Skill_1 in the example of FIG. 8) from among a plurality of skills (Skill_1 to Skill_N) on the basis of the result obtained by analyzing the voice data of the utterance. Then, the voice analysis unit 403 causes the text data of the utterance to be passed as a parameter to the specified target skill.

In this example, the target skill (a program) is read out from the recording unit 400 and is executed by the CPU (such as a CPU 1001 in FIG. 25 described later). The target skill being executed creates a request message on the basis of a parameter received from the voice analysis unit 403 and supplies it to the communication unit 402.

The communication unit 402 transmits the request message supplied from the target skill being executed to the processing server 50 via the network 70. In addition, the communication unit 402 receives the voice response data transmitted from the processing server 50 via the network 70 and supplies it to the voice generation unit 404.

The voice generation unit 404 generates voice data as a response on the basis of the voice response data supplied from the communication unit 402 and supplies it to the communication unit 401.

The communication unit 401 transmits the voice data as a response supplied from the voice generation unit 404 to the voice-user interface device 30 via the Internet 60.

Moreover, the communication unit 401 and the communication unit 402 are configured as a communication module, which is compatible with wireless communication or wired communication. In addition, in FIG. 8, the communication unit 401 and the communication unit 402 are described as separate communication modules for the convenience of description, but they can be integrated as one communication module. In addition, the recording unit 400 is a recording medium such as a semiconductor memory, an HDD, or an optical disc, and various data can be recorded therein.

In FIG. 8, the processing server 50 includes a communication unit 501, a processing unit 502, and a recording unit 503.

The communication unit 501 receives the request message transmitted from the voice assistance server 40 via the network 70 and supplies it to the processing unit 502. Moreover, the communication unit 501 is configured as a communication module, which is compatible with wireless communication or wired communication.

The processing unit 502 extracts the voice response data recorded in the recording unit 503 on the basis of the request message supplied from the communication unit 501 and supplies the result to the communication unit 501. The recording unit 503 is a recording medium such as a semiconductor memory, an HDD, or an optical disc, and various data such as voice response data can be recorded therein.

This voice response data is data use for making a voice response corresponding to the utterance of the viewer 2. Moreover, the voice response data is not limited to that recorded in the recording unit 503, and, for example, can be generated by the processing unit 502 on the basis of various types of data such as data acquired from an external server or recorded in the recording unit 503 or data acquired from an external server.

The communication unit 501 transmits the voice response data supplied from the processing unit 502 to the voice assistance server 40 via the network 70.

Moreover, the processing unit 502 is, for example, a processing module implemented as a CPU (such as a CPU 1001 in FIG. 25 described later) executing a predetermined program (a computer program). Considering that the parameters included in the request message are passed using the endpoint URL of the target skill specified (identified) by the voice assistance server 40, it can be said that they constitute a part of the target skill.

In other words, it can be said that the processing server 50 corresponds to the broadcaster XXX server 50A or the broadcaster YYY server 50B illustrated in FIGS. 5 to 7. Thus, the processing server 50 can transmit the response data (not limited to voice) to the reception apparatus 20 via the network 70 such as the Internet 60. In this case, the reception apparatus 20 performs processing based on the response data received from the processing server 50.

Processing Procedure in Each Device

Figure 9:
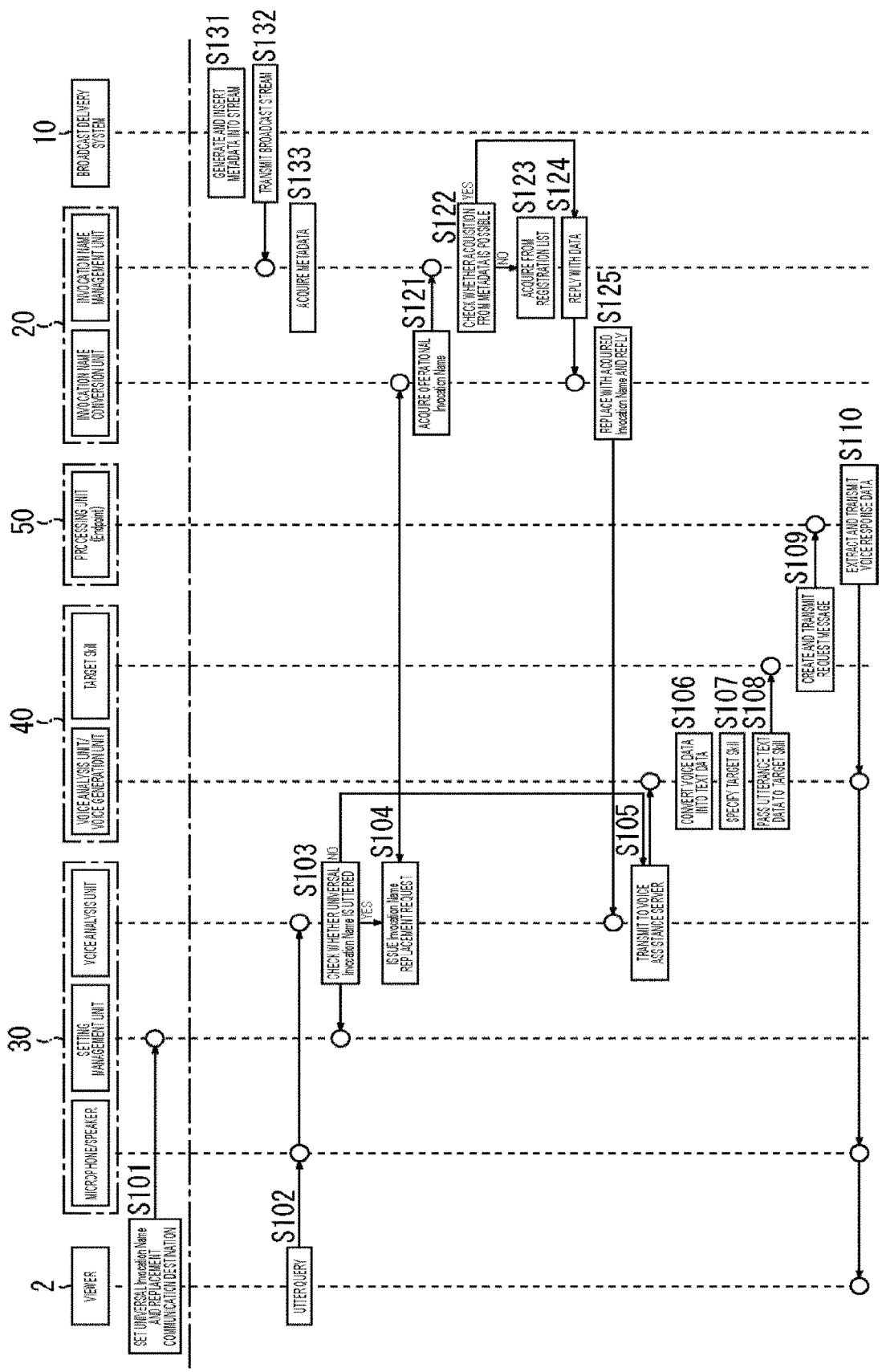
FIG. 9 is a flowchart illustrated to describe the processing procedure in each device according to the first embodiment.

The processing procedure in each device of the first embodiment is now described with reference to the flowchart of FIG. 9.

The processing of step S101 is first executed as a pre-setting. In other words, in the voice-user interface device 30, the setting management unit 306 sets the universal invocation name and the communication destination of replacement communication of the invocation name (a replacement communication destination) in accordance with the instruction from the viewer 2 (S101). In this stage, for example, it is possible to set "TV show" as the universal invocation name and to set the reception apparatus 20 as the replacement communication destination.

After the pre-setting is made, in the case where the viewer 2 who is watching the broadcast program utters a question, the processing operations of step S102 and subsequent steps are executed. In other words, in the voice-user interface device 30, the microphone 301 picks up the utterance of the viewer 2, and the voice analysis unit 304 analyzes the voice data of the picked utterance (S102).

In step S103, the voice analysis unit 304 checks (determines) whether the voice data of the analyzed utterance includes the utterance of the universal invocation name by inquiring the setting management unit 306.

Moreover, the voice analysis unit 304 is capable of acquiring the replacement communication destination used in the subsequent processing upon inquiring the setting management unit 306. In this example, it is assumed that the reception apparatus 20 is set as the replacement communication destination.

In a case where it is determined in step S103 that the universal invocation name (e.g., "TV show") is uttered, the processing proceeds to step S104. In step S104, the voice analysis unit 304 issues an invocation name replacement request to the reception apparatus 20 on the basis of the replacement communication destination acquired from the setting management unit 306.

This invocation name replacement request is received by the reception apparatus 20 using wireless communication or the like, and the processing operations of steps S121 to S125 are executed.

In step S121, the invocation name conversion unit 209 acquires the operational invocation name by inquiring the invocation name management unit 208.

In this stage, the invocation name management unit 208 checks (determines) whether the operational invocation name is capable of being acquired from the invocation name metadata (S122). In a case where it is determined that it is incapable of being acquired from the invocation name metadata ("NO" in S122), the processing proceeds to step S123.

Then, the invocation name management unit 208 acquires the operational invocation name of the channel being viewed by the viewer 2 (a viewing channel) from the registration list (an invocation name list) recorded in the recording unit 200 (S123) and replies to the invocation name conversion unit 209 (S124).

In step S125, the invocation name conversion unit 209 replaces the universal invocation name included in the invocation name replacement request with the operational invocation name replied from the invocation name management unit 208. In addition, the invocation name conversion unit 209 replies to the voice-user interface device 30 with the replaced operational invocation name (specifically, the voice data thereof) (S125).

The replaced invocation name (specifically, the voice data thereof) is received by the voice-user interface device 30 using wireless communication or the like, and the processing of step S105 is executed thereon.

In step S105, the voice analysis unit 304 transmits, to the voice assistance server 40, the voice data in which the universal invocation name part is replaced with the operational invocation name as voice data of the utterance.

In this regard, for example, as illustrated in FIG. 5, in the case where the viewer 2 who is watching the program of the broadcaster XXX utters "AAAA, ask TV show, red!!", the universal invocation name "TV show" is replaced with the operational invocation name of the broadcaster XXX, which is "XXX show". The voice data of the utterance "AAAA, ask XXX show, red!!" is transmitted.

Moreover, in a case where it is determined in step S103 that the universal invocation name is not uttered ("NO" in S103), the processing of step S104 is skipped. The invocation name replacement communication described above (step S104 and S121 to S125) is not executed, and the voice data of the utterance is transmitted to the voice assistance server 40 without any modification, assuming that the operational invocation name is uttered.

The voice assistance server 40 receives the voice data of the utterance from the voice-user interface device 30 via the Internet 60, and the processing operations of steps S106 to S109 are executed.

In step S106, the voice analysis unit 403 analyzes the voice data from the voice-user interface device 30 and converts the voice data of the utterance into text data.

In step S107, the voice analysis unit 403 specifies a target skill among a plurality of skills (e.g., Skill_1 to Skill_N) on the basis of the analysis result of the voice data of the utterance. In the voice assistance server 40, the target skill (a program) is executed by a CPU or the like, and the voice analysis unit 403 uses the converted text data of the utterance as a parameter to pass the specified target skill (e.g., Skill_1) (S108).

In step S109, the target skill creates a request message on the basis of the text data of the utterance from the voice analysis unit 403. In addition, the target skill transmits the created request message to the processing server 50 (specifically, the processing unit 502 thereof) specified by the endpoint URL via the network 70.

The processing server 50 receives this request message via the network 70, and the processing of step S110 is executed.

In step S110, the processing unit 502 extracts voice response data recorded in the recording unit 503 on the basis of the request message from the voice assistance server 40 (the target skill executed thereby). In this process, data for making a voice response to the query utterance of the viewer 2 is extracted.

Further, the processing unit 502 transmits the extracted voice response data to the voice assistance server 40 via the network 70. In the voice assistance server 40, the voice generation unit 404 generates voice data as a response on the basis of the voice response data and transmits it to the voice-user interface device 30 via the Internet 60.

This configuration allows the voice-user interface device 30 to output a response voice corresponding to the voice data as a response from the voice assistance server 40 through the speaker 302. Thus, the viewer 2 is able to check the response voice corresponding to the viewer's own query utterance.

The above description is given of the processing procedure in the case where the skill is static, that is, there is no dynamic change in skills. However, in a case where there is a dynamic change in skills, in addition to the processing procedure described above, processing operations including the processing or the like of steps S131 to S133 of FIG. 9 are executed.

In other words, in the broadcast delivery system 10, the metadata generation unit 103 generates invocation name metadata, and the multiplexer 104 inserts the generated invocation name metadata into a stream including content and broadcast-accompanying application (S131).

In this description, for example, in a case where the content is delivered as a stream compliant to MPEG-dynamic adaptive streaming over HTTP (DASH), it is possible to transfer the invocation name metadata using a media presentation description (MPD), which is the control information of the video or audio file.

FIG. 10 shows an example in which the invocation name metadata is inserted into the MPD. In this example, the MPD includes elements of Period, AdaptationSet, and Representation in a hierarchical structure.

The element Period is an element to describe the configuration of content such as broadcast programs. In addition, the elements AdaptationSet and Representation, which are used for each stream of components such as video, audio, and subtitle that constitute the content, are capable of describing an attribute of each stream.

Further, it is possible to describe an element EventStream in the element Period. In addition, it is possible to describe an attribute schemeIdUri in the element EventStream as its attribute. In the attribute schemeIdUri, a uniform resource identifier (URI) used to identify the scheme is described. In the MPD description example of FIG. 10, 'urn:XXX' is defined as the URI that identifies the scheme for transferring the invocation name metadata of the broadcaster XXX, and is described as the attribute value of the attribute schemeIdUri.

Further, the element EventStream is a superordinate element of an element Event. It is possible to describe an attribute messageData in which the data of the event message is specified as the attribute of the element Event. In the MPD description example of FIG. 10, the operational invocation name used in the program of the broadcaster XXX is described in the element Period as the attribute value of the attribute messageData of the Element Event in the element EventStream.

Specifically, "XXX Drama" is described in the first Period element (start attribute="PT0S") as the operational invocation name for the drama program of the broadcaster XXX, and 'XXX Quiz' is described in the second Period element (start attribute='PT1H0M0S') as the operational invocation name for the quiz program of the broadcaster XXX.

Moreover, it is possible to describe an attribute presentationTime in which the presentation time (start time) is specified and a duration attribute in which the period from the start time is specified in the Element Event as its attribute, in addition to the attribute messageData. In this example, it is assumed that the operational invocation name described as the attribute value of the attribute messageData is normally valid without using these attributes.

Referring back to FIG. 9, in step S132, the sending unit 105 transmits the broadcast stream in which the invocation name metadata is inserted. The reception apparatus 20 receives this broadcast stream, and the processing of step S133 is executed thereon.

In step S133, the invocation name management unit 208 acquires the invocation name metadata obtained from the stream separated by the demultiplexer 202.

Then, when the invocation name management unit 208 receives an inquiry about the operational invocation name from the invocation name conversion unit 209 in the processing of step S121 described above, it is determined that it can be acquired from the invocation name metadata in the checking processing of step S122 ("YES" in S122). Thus, the processing of step S123 is skipped and the processing proceeds to step S124.

In step S124, the invocation name management unit 208 acquires the operational invocation name from the invocation name metadata and replies to the invocation name conversion unit 209. This allows the invocation name conversion unit 209 to replace the universal invocation name included in the invocation name replacement request with the operational invocation name replied from the invocation name management unit 208 (S125).

Then, the voice-user interface device 30 is to transmit, to the voice assistance server 40, the voice data in which the universal invocation name part is replaced with the operational invocation name as voice data of the utterance.

In this regard, for example, as illustrated in FIG. 7, in the case where the viewer 2 who is watching the drama program of the broadcaster YYY utters "AAAA, ask TV show, Who is Lis?", the universal invocation name "TV show" is replaced with the operational invocation name the drama program of the broadcaster XXX, which is "XXX Drama". The voice data of the utterance "AAAA, ask XXX Drama, Who is Lis?" is transmitted.

The above description is given of, as the processing procedure in each device of the first embodiment, particularly, the processing of replacing the universal invocation name uttered by the viewer 2 with the operational invocation name of the program being viewed in the case where there is no dynamic change in skills and in the case where there is a dynamic change in skills.

As described above, in the first embodiment, the processing unit 220 of the reception apparatus 20, when using the voice AI assistance service that is in cooperation with the content such as the broadcast program of the broadcaster XXX or YYY, processes the specific information associated with the universal invocation name (universal invoking name) included the utterance voice of the viewer 2. This processing is performed on the basis of the association information (a registration list) in which the universal invocation name and the information specific for each skill (a program) are associated. The universal invocation name (a universal invoking name) that is common to a plurality of skills (programs) as an invocation name (an invoking name) used to invoke a skill (a program) that performs processing corresponding to the voice uttered by the viewer 2 who views the content.

Further, in the association information (registration list), the operational invocation name (specific invoking name) is associated with the universal invocation name (universal invoking name) as specific information for each skill (a program). The processing unit 220 performs the processing of converting the universal invocation name (universal invoking name) into the operational invocation name (specific invoking name) on the basis of the association information (registration list) as the processing of the specific information associated with the universal invocation name (universal invoking name). In addition, the operational invocation name (specific invoking name) is also capable of being acquired from the invocation name metadata (metadata) delivered via broadcasting. Thus, it can be said that the reception apparatus 20 is an information processing apparatus including the processing unit 220.

For example, this allows the viewer 2 to use the desired skill by uttering the universal invocation name even in the case where the skills to be used are different, such as the skill of the broadcaster XXX or the broadcaster YYY. Thus, it is possible to improve the convenience of the voice AI assistance service that is used in cooperation with the content such as broadcast programs of the broadcaster XXX or the Broadcaster YYY.

Moreover, the above description is given of the operation in the case where there is no dynamic change in skills and the operation in the case where there is a dynamic change in skills, but these operations can be performed separately or can be performed simultaneously. In addition, in the reception apparatus 20, the registration list is recorded in the recording unit 200 at the timing before the communication for replacing the invocation names is performed, but the timing is optional.

(2) Second Embodiment

Although the first embodiment employs the configuration in which the invocation name is replaced on the local side, the voice assistance server 40 on the cloud side can employ the configuration in which the target skill is switched using the alias skill. In this case, the viewer 2 is able to use the desired skill by uttering the invocation name of the alias skill. Thus, the description is given of a second embodiment employing a configuration in which the target skill is switched using the alias skill in the cloud-side voice assistance server 40 with reference to FIGS. 11 to 16.

In this description, the alias skill is a skill including an invocation name that invokes itself (an invocation name of an alias skill) and a pair table of metadata information of a broadcast program and the corresponding skill (a program for switching). The use of this alias skill makes it possible to switch to another skill (normal skill) corresponding to the information on the basis of the metadata information of the broadcast program.

It can be said that the invocation name of this alias skill is a universal invocation name (universal invoking name) from the viewpoint of the viewer 2 on the local side. In addition, in the second embodiment, a normal skill is also referred to as a normal skill to distinguish it from the alias skill.

First Example of Configuration

Figure 11:
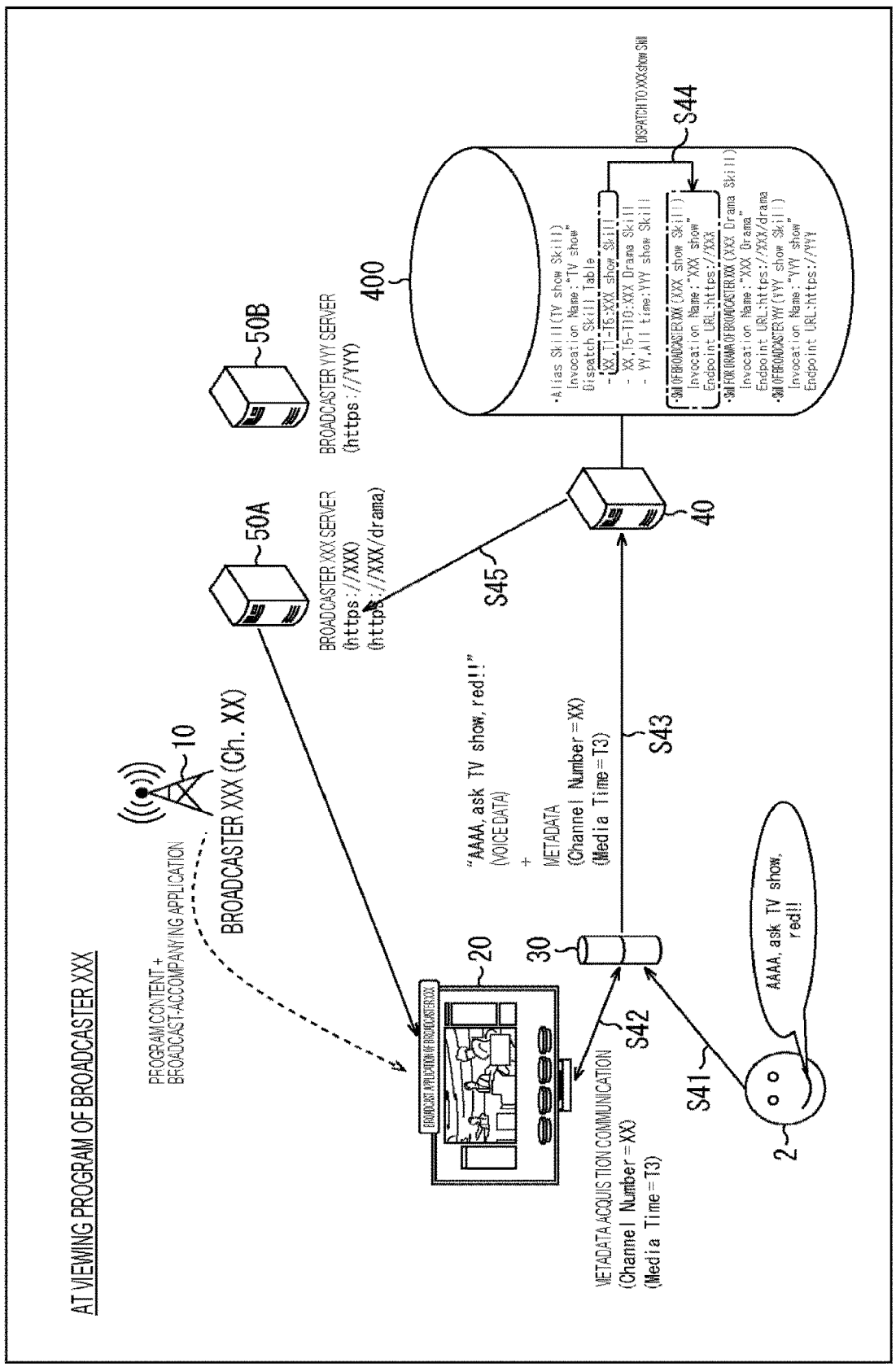
FIG. 11 is a diagram illustrating a first example of the configuration of a second embodiment.

FIG. 11 is a diagram illustrating a first example of a configuration of the second embodiment.

In FIG. 11, in the case where the viewer 2 is watching the quiz program of the broadcaster XXX, in the reception apparatus 20, the broadcast-accompanying application of the broadcaster XXX is executed in conjunction with the quiz program of the broadcaster XXX. Moreover, in FIG. 11, the reception apparatus 20 does not record the above-mentioned registration list (an invocation name list).

In this description, the first example assumes that the viewer 2 uses the skills provided by the broadcaster XXX (normal skill) to participate in the quiz program of the broadcaster XXX being viewed. In this case, the viewer 2 utters, for example, "AAAA, ask TV show, red!!" to the voice-user interface device 30 and tells the viewer's own answer for the given quiz (S41).

In this case, the voice-user interface device 30 performs wireless communication with the reception apparatus 20 to acquire metadata used to specify the content (hereinafter, also referred to as context metadata) being viewed by the viewer 2 (S42). Moreover, although details will be described later, the context metadata can include, for example, viewing information such as a channel number (Channel Number) of a broadcast program being viewed (currently viewed) and media time (Media Time).

As described above, the pre-settings are made so that the reception apparatus 20 performs communication with the voice-user interface device 30 to acquire context metadata with itself when the invocation name ("TV show") is detected from the utterance by the viewer 2.

Then, in a case where a context metadata acquisition request is issued from the voice-user interface device 30, the reception apparatus 20 replies to the voice-user interface device 30 with context metadata that includes the channel number and media time of the program being viewed. This makes it possible for the voice-user interface device 30 to add and transmit the context metadata to the voice data of the utterance.

Specifically, the voice-user interface device 30 transmits the context metadata of Channel Number=XX and Media Time=T3 to the voice assistance server 40 via the Internet 60 together with the voice data of the utterance "AAAA, ask TV show, red!!" (S43).

The voice assistance server 40 records the alias skill in the recording unit 400 included therein. The alias skill (Alias Skill) includes an invocation name (e.g., "TV show") for invoking itself and a pair table of metadata information of a broadcast program and the corresponding skill.

In the example of FIG. 11, a dispatch skill table and the skill of each broadcast station are associated with each other as an alias skill invoked by the invocation name that is "TV show". Specifically, the dispatch skill table assigns skills of the broadcaster XXX at times of T1 to T5 to a channel number of XX and assigns skills of the drama program of the broadcaster XXX at times of T5 to T10. In addition, the dispatch skill table assigns skills of the broadcaster YYY to the channel number that is YY in all time zones.

Further, in the example of FIG. 11, in the alias skill, as the skill (normal skill) of each broadcast station associated with the dispatch skill table, the skill of the broadcaster XXX, the skill of the drama program of the broadcaster XXX, and the skill of the broadcaster YYY are registered.

In this description, the invocation name "XXX Show" and the endpoint URL "https://XXX" are registered as the skill information of the broadcaster XXX. In addition, as the skill information for the drama program of the broadcaster XXX, the invocation name "XXX Drama" and the endpoint URL "https://XXX/drama" are registered, and as the skill information of the broadcaster YYY, the invocation name "YYY Show" and the endpoint URL "https://YYY" are registered.

Moreover, this alias skill is created, for example, by a manufacturer that manufactures the reception apparatus 20 such as a television set, separately from the skill (normal skill) of each broadcast station, and is provided for the voice assistance server 40.

The voice assistance server 40 converts the voice data of the utterance from the voice-user interface device 30 into text data. In addition, in the voice assistance server 40, the alias skill is specified on the basis of the invocation name (the invocation name of the alias skill) that is "TV show" obtained from the text data of the utterance, and the specified alias skill causes the skill to be dispatched to the corresponding skill (normal skill) on the basis of the context metadata (channel number and media time) (S44).

More specifically, the context metadata includes Channel Number=XX and Media Time=T3, so it is possible to dispatch to the skill of the broadcaster XXX (XXX show Skill) assigned at the times T1 to T5 for the channel number XX according to the dispatch skill table in the specified alias skill. Then, the parameter (text data of the utterance) is passed to the skill of the broadcaster XXX dispatched by the alias skill.

In this example, the URL "https://XXX" is set as the endpoint URL of the skill of the broadcaster XXX, so the skill of the XXX broadcaster executed in the voice assistance server 40 notifies the broadcaster XXX server 50A of a request message. Thus, the skill of the broadcaster XXX (e.g., the processing on an answer for the quiz, "red") is processed and the processing result is presented (S45). In this event, for example, the skill of the broadcaster XXX is capable of cooperating with the broadcast-accompanying application of the broadcaster XXX to incorporate the processing result in the contents presented by the broadcast-accompanying application, as described above.

In this way, the viewer 2 is able to participate in the quiz program being viewed. Specifically, in this example, when the viewer 2 uses the skill provided by the broadcaster XXX (normal skill), it is sufficient for the viewer 2 to speak to the voice-user interface device 30 about the universal invocation name "TV show" (invocation name of an alias skill). Thus, it is possible for the viewer to interact with the skill provided by each broadcast station (or a particular criterion such as program or the like) with only one invocation name.

Second Example of Configuration

Figure 12:
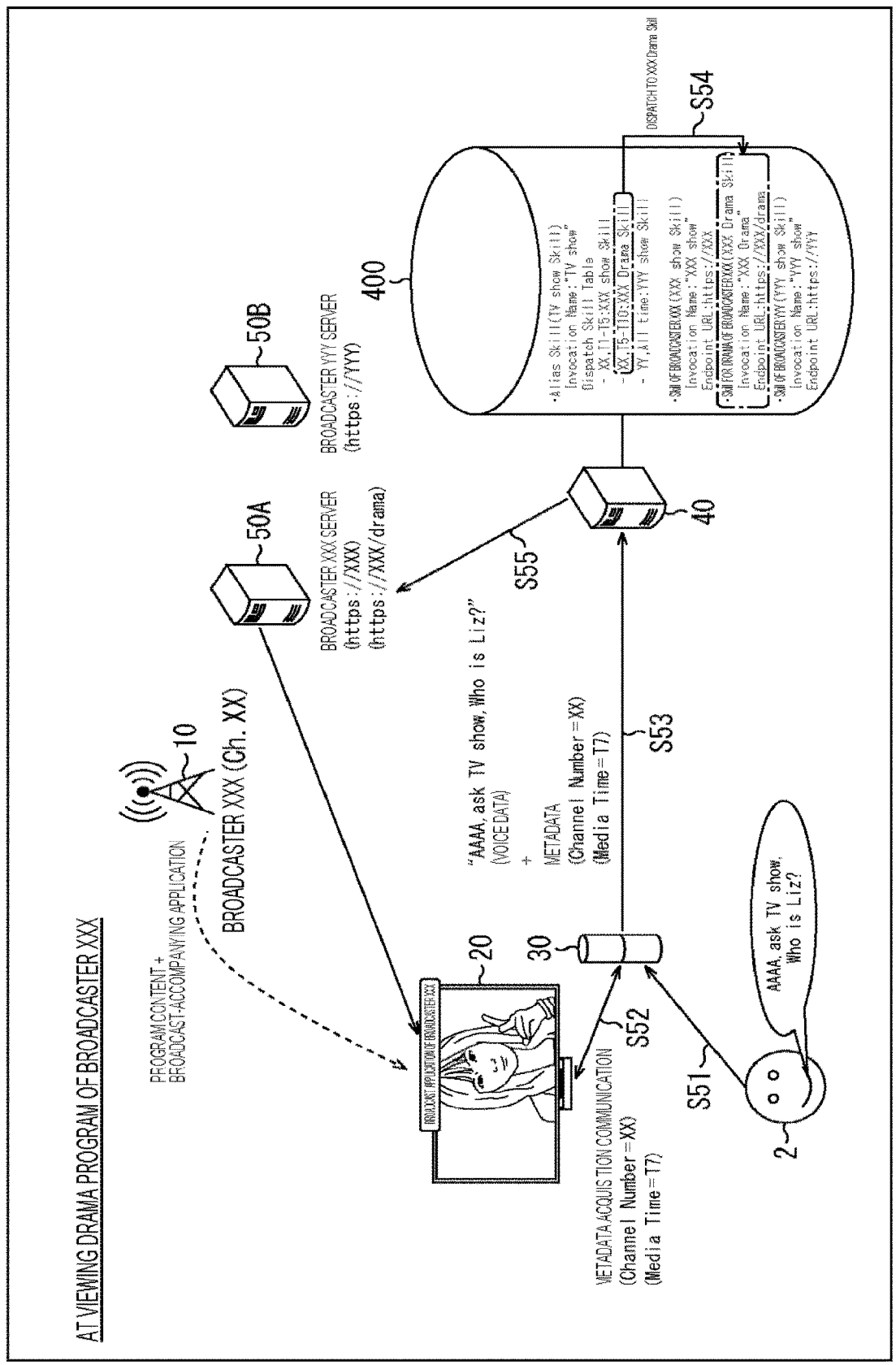
FIG. 12 is a diagram illustrating a second example of the configuration of the second embodiment.

FIG. 12 is a diagram illustrating a second example of a configuration of the second embodiment.

In FIG. 12, in the case where the viewer 2 is watching the drama program of the broadcaster XXX, in the reception apparatus 20, the broadcast-accompanying application of the broadcaster XXX is executed in conjunction with the drama program of the broadcaster XXX.

In this regard, the second example assumes that the viewer 2 uses the skill for a drama program provided by the broadcaster XXX to ask a question about the contents of the drama program. In this example, the viewer 2 utters, for example, "AAAA, ask TV show, Who is Liz?" to the voice-user interface device 30 to ask a question about the contents of the drama program (S51).

In this case, the voice-user interface device 30 performs wireless communication with the reception apparatus 20 to acquire the context metadata (S52). Then, the voice-user interface device 30 transmits the context metadata of Channel Number=XX and Media Time=T7 to the voice assistance server 40 via the Internet 60 together with the voice data of the utterance "AAAA, ask TV show, Who is Liz?" (S53).

The voice assistance server 40 converts the voice data of the utterance from the voice-user interface device 30 into text data. In addition, in the voice assistance server 40, the alias skill is specified on the basis of the invocation name that is "TV show" obtained from the text data of the utterance, and the alias skill causes the skill to be dispatched to the corresponding skill (normal skill) on the basis of the context metadata (channel number and media time) (S54).

In the second example, the context metadata includes Channel Number=XX and Media Time=T7, so it is possible to dispatch to the skill for drama programs of the broadcaster XXX (XXX Drama Skill) assigned at the times T5 to T10 for the channel number XX according to the dispatch skill table in the specified alias skill. Then, the parameter (text data of the utterance) is passed to the skill for drama programs of the broadcaster XXX dispatched by the alias skill.

In this example, the URL "https://XXX/drama" is set as the endpoint URL of the skill for drama programs of the broadcaster XXX, so the voice assistance server 40 notifies the broadcaster XXX server 50A of a request message. Thus, the skill for drama programs of the broadcaster XXX (e.g., the processing on a question, "Who is Liz?") is processed and the processing result is presented (S55). In this event, for example, the skill for drama programs of the broadcaster XXX is capable of cooperating with the broadcast-accompanying application of the broadcaster XXX to incorporate the processing result in the contents presented by the broadcast-accompanying application, as described above.

In this way, the viewer 2 is able to obtain the information regarding the contents of the drama program being viewed. Specifically, in this example, when the viewer 2 uses the skill for drama programs of the broadcaster XXX (normal skill), it is sufficient for the viewer 2 to speak to the voice-user interface device 30 about the universal invocation name "TV show" (invocation name of an alias skill). Thus, it is possible for the viewer to interact with the skill provided by each broadcast station (or a particular criterion such as program or the like) with only one invocation name.

More specifically, comparing the second example illustrated in FIG. 12 with the first example illustrated in FIG. 11, the skills for drama programs used by the broadcaster XXX are different from the skills used by the broadcaster XXX, but both viewers 2 are able to use the desired skill by uttering the universal invocation name "TV show".

Third Example of Configuration

Figure 13:
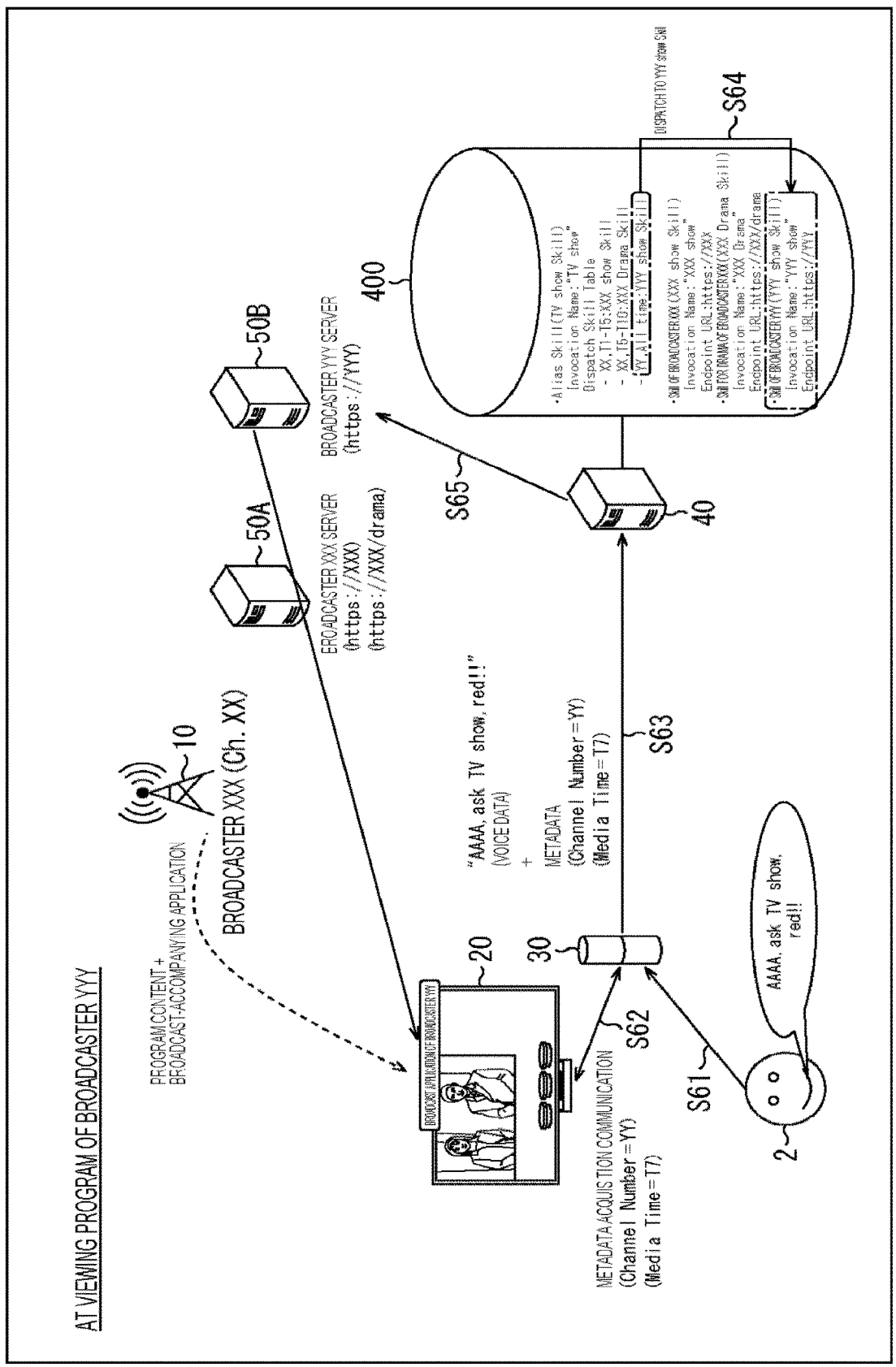
FIG. 13 is a diagram illustrating a third example of the configuration of the second embodiment.

FIG. 13 is a diagram illustrating a third example of a configuration of the second embodiment.

In FIG. 13, in the case where the viewer 2 is watching the information program of the broadcaster YYY, in the reception apparatus 20, the broadcast-accompanying application of the broadcaster YYY is executed in conjunction with the information program of the broadcaster YYY.

In this description, the third example assumes that the viewer 2 uses the skills provided by the broadcaster YYY to participate in the information program of the broadcaster YYY being viewed. In this regard, the viewer 2 utters, for example, "AAAA, ask TV show, red!!" to the voice-user interface device 30 and, for example, replies to the game with an answer, votes on a questionnaire, or the like (S61).

In this case, the voice-user interface device 30 performs wireless communication with the reception apparatus 20 to acquire the context metadata (S62). Then, the voice-user interface device 30 transmits the context metadata of Channel Number=YY and Media Time=T7 to the voice assistance server 40 via the Internet 60 together with the voice data of the utterance "AAAA, ask TV show, red! !" (S63).

The voice assistance server 40 converts the voice data of the utterance from the voice-user interface device 30 into text data. In addition, in the voice assistance server 40, the alias skill is specified on the basis of the invocation name that is "TV show" obtained from the text data of the utterance, and the alias skill causes the skill to be dispatched to the corresponding skill (normal skill) on the basis of the context metadata (channel number and media time) (S64).

In the third example, the context metadata includes Channel Number=YY and Media Time=T7, so it is possible to dispatch to the skill of the broadcaster YYY (YYY show Skill) assigned at the times All time for the channel number YY according to the dispatch skill table in the specified alias skill. Then, the parameter (text data of the utterance) is passed to the skill of the broadcaster YYY dispatched by the alias skill.

In this example, the URL "htttps://YYY" is set as the endpoint URL of the skill of the broadcaster YYY, so the voice assistance server 40 notifies the broadcaster YYY server 50B of a request message. Thus, the skill of the broadcaster YYY (e.g., the processing on a reply or the like for the game, "red") is processed and the processing result is presented (S65). In this event, for example, the skill of the broadcaster YYY is capable of cooperating with the broadcast-accompanying application of the broadcaster YYY to incorporate the processing result in the contents presented by the broadcast-accompanying application, as described above.

In this way, the viewer 2 is able to participate in the information program being viewed. Specifically, in this example, when the viewer 2 uses the skill of the broadcaster YYY (normal skill), it is sufficient for the viewer 2 to speak to the voice-user interface device 30 about the universal invocation name "TV show" (invocation name of an alias skill). Thus, it is possible for the viewer to interact with the skill provided by each broadcast station (or a particular criterion such as program or the like) with only one invocation name.

More specifically, comparing the third example illustrated in FIG. 13 with the first example illustrated in FIG. 11 and the second example illustrated in FIG. 12, the skills of the drama program used by the broadcaster YYY are different from the skills used by the broadcaster XXX and the skills for drama programs used by the broadcaster XXX, but both viewers 2 are able to use the desired skill by uttering the universal invocation name "TV show".

Example of Detailed Configuration of Each Device

Figure 14:
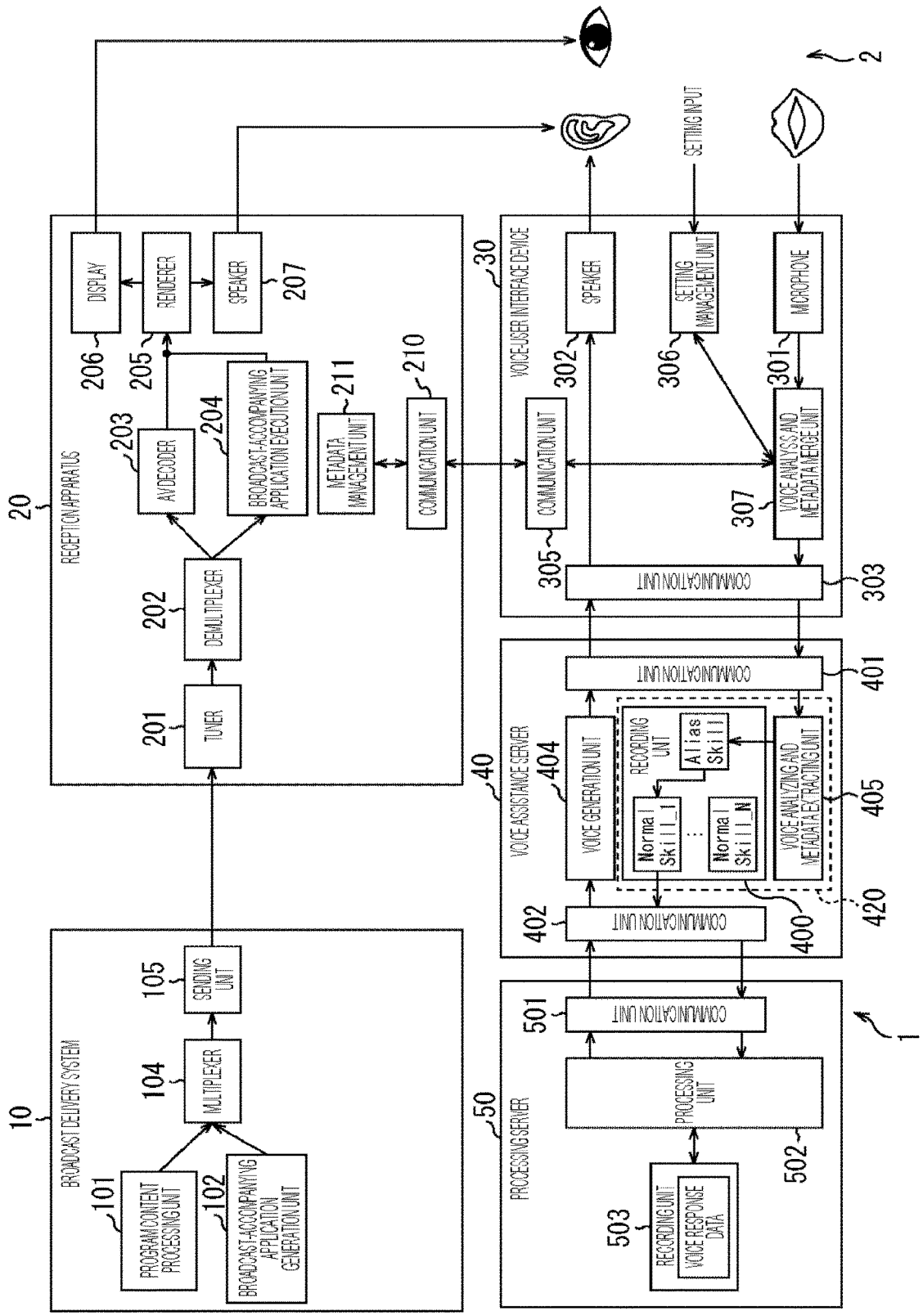
FIG. 14 is a block diagram illustrating an example of a detailed configuration of each device according to the second embodiment.

FIG. 14 is a block diagram illustrating an example of a detailed configuration of each device according to the second embodiment.

FIG. 14 illustrates an example of the configuration of the broadcast delivery system 10 on the transmitting side and the reception apparatus 20 on the receiving side and an example of the configuration of the voice-user interface device 30 on the local side and the voice assistance server 40 and the processing server 50 on the cloud side, which is similar to FIG. 8.

Moreover, in FIG. 14, the broadcast delivery system 10 and the processing server 50 are similar in configuration to those illustrated in FIG. 8, and so the description thereof is omitted. However, in the second embodiment, the broadcast delivery system 10 is unnecessary to generate the invocation name metadata, and so the metadata generation unit 103 is omitted.

In FIG. 14, the reception apparatus 20 includes a tuner 201, a demultiplexer 202, an AV decoder 203, a broadcast-accompanying application execution unit 204, a renderer 205, a display 206, a speaker 207, a communication unit 210, and a metadata management unit 211. In other words, the reception apparatus 20 illustrated in FIG. 14 has the metadata management unit 211 instead of the recording unit 200, the invocation name management unit 208, and the invocation name conversion unit 209 as compared with the configuration illustrated in FIG. 8.

The metadata management unit 211 acquires viewing information of a program being viewed and manages context metadata including the viewing information. In other words, the metadata management unit 211, in a case of receiving a metadata acquisition request from the voice-user interface device 30, generates context metadata (channel number and media time) on the basis of the acquired viewing information and replies to the voice-user interface device 30.

In FIG. 14, the voice-user interface device 30 includes a microphone 301, a speaker 302, a communication unit 303, a communication unit 305, a setting management unit 306, and a voice analysis and metadata merge unit 307. In other words, the voice-user interface device 30 illustrated in FIG. 14 is different from the configuration illustrated in FIG. 8 in that the voice analysis and metadata merge unit 307 is provided instead of the voice analysis unit 304.

The voice analysis and metadata merge unit 307 analyzes the voice utterance on the basis of the voice data of the utterance supplied from the microphone 301.

Further, in a case where the invocation name of the alias skill is uttered, the voice analysis and metadata merge unit 307 transmits a metadata acquisition request to the reception apparatus 20 to acquire context metadata (channel number and media time). The voice analysis and metadata merge unit 307 adds the acquired context metadata to the voice data of the utterance to generate transmission data. The transmission data is transmitted to the voice assistance server 40 via the Internet 60 through the communication unit 303.

In FIG. 14, the voice assistance server 40 includes a recording unit 400, a communication unit 401, a communication unit 402, a voice generation unit 404, and a voice analyzing and metadata extracting unit 405.

In other words, in the voice assistance server 40 illustrated in FIG. 14, the voice analyzing and metadata extracting unit 405 is provided instead of the voice analysis unit 403 as compared with the configuration illustrated in FIG. 8. In addition, in the recording unit 400, instead of a plurality of skills (Skill_1 to Skill_N), an alias skill and a plurality of normal skills (Normal Skill_1 to Normal Skill_N) are recorded. Moreover, the alias skill and the normal skills (programs thereof) are read from the recording unit 400 and executed by the CPU (such as a CPU 1001 in FIG. 25 described later).

The voice analyzing and metadata extracting unit 405 converts the voice data of the utterance included in the transmission data from the voice-user interface device 30 into text data. In addition, the voice analyzing and metadata extracting unit 405 specifies a target skill on the basis of the result obtained by analyzing the voice data of the utterance. In a case where the specified target skill is an alias skill, the voice analyzing and metadata extracting unit 405 passes the context metadata (channel number and media time) extracted from the transmission data together with the converted text data of the utterance to the alias skill being executed.

The alias skill being executed specifies a target normal skill (e.g., Normal Skill_1 in the example of FIG. 14) that matches the context metadata (channel number and media time) from the voice analyzing and metadata extracting unit 405 on the basis of the dispatch skill table or the like, and passes the text data of the utterance as a parameter.

The normal skill (e.g., Normal Skill_1) dispatched by the alias skill creates a request message on the basis of the text data of the utterance passed as a parameter. The request message is transmitted through the communication unit 402 to the processing server 50 via the network 70.

Moreover, in the voice assistance server 40, the voice analyzing and metadata extracting unit 405 and processing modules for processing an alias skill, a normal skill, and the like being executed constitute a processing unit 420 that performs processing depending on an invocation name of the alias skill.

Processing Procedure in Each Device

Figure 15:
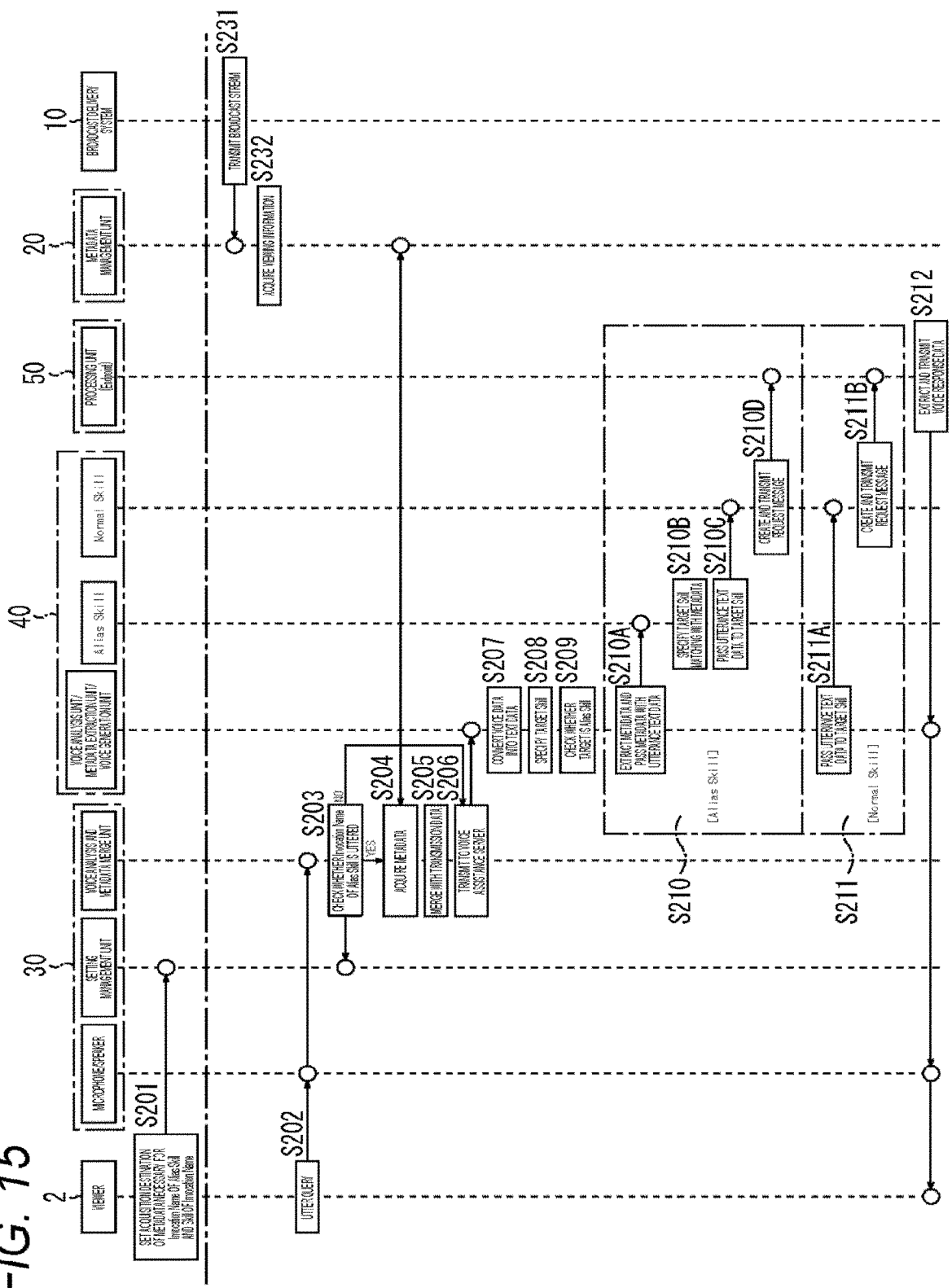
FIG. 15 is a flowchart illustrated to describe the processing procedure in each device according to the second embodiment.

The processing procedure in each device of the second embodiment is now described with reference to the flowchart of FIG. 15.

The processing of step S201 is first executed as a pre-setting. In other words, in the voice-user interface device 30, the setting management unit 306 sets an invocation name of the alias skill (universal invocation name) and a destination of the context metadata necessary for the skill (metadata acquisition communication destination) in accordance with the instruction from the viewer 2 (S201).

In this description, for example, "TV show" can be set as the invocation name of the alias skill, and the reception apparatus 20 can be set as the metadata acquisition communication destination.

When this pre-setting is performed, the reception apparatus 20 receives the broadcast stream transmitted from the broadcast delivery system 10 and plays back the broadcast program corresponding to a channel tuning operation by the viewer 2 (S231). In this event, in the reception apparatus 20, the metadata management unit 211 acquires the viewing information of the broadcast program being viewed (S232).

Further, in the case where the viewer 2 utters a question, the processing operations of step S202 and subsequent steps are executed. In other words, in the voice-user interface device 30, the microphone 301 picks up the utterance of the viewer 2, and the voice analysis and metadata merge unit 307 analyzes the voice data of the picked utterance (S202).

In step S203, the voice analysis and metadata merge unit 307 checks (determines) whether the voice data of the analyzed utterance includes the utterance of the invocation name of the alias skill by inquiring the setting management unit 306.

Moreover, the voice analysis and metadata merge unit 307 is capable of acquiring the metadata acquisition communication destination used in the subsequent processing upon inquiring the setting management unit 306. In this example, it is assumed that the reception apparatus 20 is set as the metadata acquisition communication destination.

In a case where it is determined in step S203 that the invocation name of the alias skill is uttered ("YES" in step S203), the processing proceeds to step S204. In step S204, the voice analysis and metadata merge unit 307 issues a metadata acquisition request to the reception apparatus 20 using wireless communication or the like on the basis of the metadata acquisition communication destination acquired from the setting management unit 306 to acquire context metadata.

In other words, in the reception apparatus 20, in a case where the metadata acquisition request from the voice-user interface device 30 is received, the metadata management unit 211 generates the context metadata (channel number and media time) and replies to the voice-user interface device 30 on the basis of the viewing information of the broadcast program being viewed. This makes it possible for the voice analysis and metadata merge unit 307 to acquire the context metadata including the channel number (Channel Number) and the media time (Media Time) of the broadcast program being viewed (currently viewed).

In step S205, the voice analysis and metadata merge unit 307 merges the acquired context metadata (channel number and media time) with the transmission data. In this example, the context metadata including the channel number and media time of the broadcast program being viewed is added to the voice data of the utterance to generate transmission data.

As this transmission data, for example, data as illustrated in FIG. 16 can be transmitted. In other words, the voice analysis and metadata merge unit 307 describes (merges) the context metadata as JavaScript (registered trademark) object notation (JSON) format data in the body of the HTTP request in which the voice data of the utterance is arranged to generate a multipart HTTP request.

The JSON format object is expressed by key-value pairs with a colon (:), and these pairs are separated by a comma (,), zero or more of pairs are listed, and the whole is enclosed in curly braces ({ }). In the example of FIG. 16, the channel number "8.1" is described as a value of the channel number, and the media time "2018-01-29T18:00:05Z" is described as a value of the media time for the object of context metadata ("ContextMetaDatas").

Referring back to FIG. 15, in step S206, the voice analysis and metadata merge unit 307 transmits the generated transmission data to the voice assistance server 40. The voice assistance server 40 receives the transmission data transmitted from the voice-user interface device 30, and the processing of steps S207 to S211 is executed.

In step S207, the voice analyzing and metadata extracting unit 405 converts the voice data of the utterance included in the transmission data from the voice-user interface device 30 into text data.

In step S208, the voice analyzing and metadata extracting unit 405 specifies the target skill on the basis of the result obtained by analyzing the voice data of the utterance.

In step S209, the voice analyzing and metadata extracting unit 405 checks (determines) whether or not the specified target skill is an alias skill. Depending on the result of the determination processing in step S209, either the alias skill processing or the normal skill processing is executed. Moreover, in this case, in the voice assistance server 40, the alias skill or the normal skill is executed by the CPU or the like.

In other words, in a case where it is determined in step S209 that the specified target skill is an alias skill, the processing proceeds to step S210, and the alias skill processing is executed by the voice assistance server 40 and the processing server 50.

In this alias skill processing, first, the voice analyzing and metadata extracting unit 405 extracts context metadata from the transmission data, and passes the extracted context metadata together with the converted text data of the utterance to the alias skill being executed (S210A).

Then, the alias skill specifies a target skill (a normal skill) that matches the context metadata (channel number and media time) from the voice analyzing and metadata extracting unit 405 on the basis of the dispatch skill table or the like (S210B). In addition, the alias skill passes the text data of the utterance as a parameter to the target skill (the normal skill) specified by itself in the processing of step S210B (S210C).

In this way, the normal skill dispatched by the alias skill creates a request message on the basis of the text data of the utterance passed as a parameter (S210D). Then, the normal skill transmits the created request message to the processing server 50 (the processing unit 502 thereof) specified by the endpoint URL via the network 70 (S210D).

On the other hand, in a case where it is determined in step S209 that the specified target skill is not the alias skill, that is, the normal skill, the processing proceeds to step S211, and the voice assistance server 40 and the processing server 50 execute the normal skill processing.

In this normal skill processing, the voice analyzing and metadata extracting unit 405 passes the text data of the utterance as a parameter to the target skill (normal skill) specified in the processing of step S208 (S211A). The normal skill creates a request message on the basis of the text data of the utterance passed as a parameter and transmits the request message to the processing server 50 (the processing unit 502 thereof) specified by the endpoint URL (S211B).

When the alias skill processing (S210) or the normal skill processing (S211) is completed, the processing proceeds to step S212. Specifically, the processing server 50 receives the request message transmitted by the target skill (normal skill) via the network 70 and executes the processing of step S212.

In step S212, the processing unit 502 extracts the data of the voice response to the query uttered by the viewer 2 on the basis of the request message and transmits it to the voice assistance server 40 via the network 70. This configuration allows the voice-user interface device 30 to output a response voice corresponding to the voice data as a response from the voice assistance server 40 from the speaker 302. Thus, the viewer 2 is able to check the response voice corresponding to the viewer's own query utterance.

The above description is given, as the processing procedure of each device of the second embodiment, of the processing procedure in the case where the target skill is switched using the alias skill in the voice assistance server 40 on the cloud side.

As described above, in the second embodiment, when the processing unit 420 of the voice assistance server 40 uses the voice AI assistance service in cooperation with the content such as broadcast programs of the broadcaster XXX or the broadcaster YYY, the specific information is processed. This specific information is associated with the invocation name (universal invoking name) of the alias skill included in the voice uttered by the viewer 2. This processing is performed on the basis of the invocation name (universal invoking name) of the alias skill and the association information (such as dispatch skill table of the alias skill) associated with information specific for each normal skill (program). The invocation name (universal invoking name) of the alias skill is common to a plurality of normal skills (programs) as an invocation (invoking name) for invoking a normal skill (a program) that performs processing corresponding to the voice uttered by a viewer who views the content.

Further, the association information is information (such as a dispatch skill table) in which context metadata (metadata) used to specify the broadcast program (content) that the viewer 2 is viewing and the normal skill (specific program) are associated with each other. The association information is included in the alias skill (a program for switching) specified by the invocation name (universal invoking name) of the alias skill. In the processing unit 420, the alias skill (a program for switching) is specified on the basis of the invocation name (universal invoking name) of the alias skill, and the alias skill (a program for switching) is dispatched to the normal skill (specific program) associated with the context metadata (metadata). The processing corresponding to the voice uttered by the viewer 2 is performed. Thus, it can be said that the voice assistance server 40 is an information processing apparatus including the processing unit 420.

This allows the viewer 2 to use the desired skill by uttering the invocation name of the alias skill (the universal invocation name) even in the case where the skills to be used are different, such as the skill of the broadcaster XXX or the broadcaster YYY. Thus, it is possible to improve the convenience of the voice AI assistance service that is used in cooperation with the content such as broadcast programs of the broadcaster XXX or the Broadcaster YYY.

Moreover, the above description is given of the case where the viewing information such as the channel number (Channel Number) and the media time (Media Time) of the broadcast program being viewed (currently viewed) is included as the context metadata. However, the context information to be included in the context metadata is not limited to the viewing information, and various types of information can be included. For example, the reception apparatus 20, the voice-user interface device 30, or the like on the local side can acquire useful context information in the voice AI assistance service from other devices such as related peripheral devices by wireless communication such as Bluetooth (registered trademark). In addition, the context metadata can be added to the voice data of the utterance and can be transmitted.

(3) Third Embodiment

Then, a third embodiment shows a configuration in which the voice assistance server 40 on the cloud side generates a private skill linked to the viewer's count information, and the private skill is updated (the real-time update) on the basis of the metadata delivered via broadcasting with reference to FIGS. 17 to 23.

Example of Configuration at Initial Registration

Figure 17:
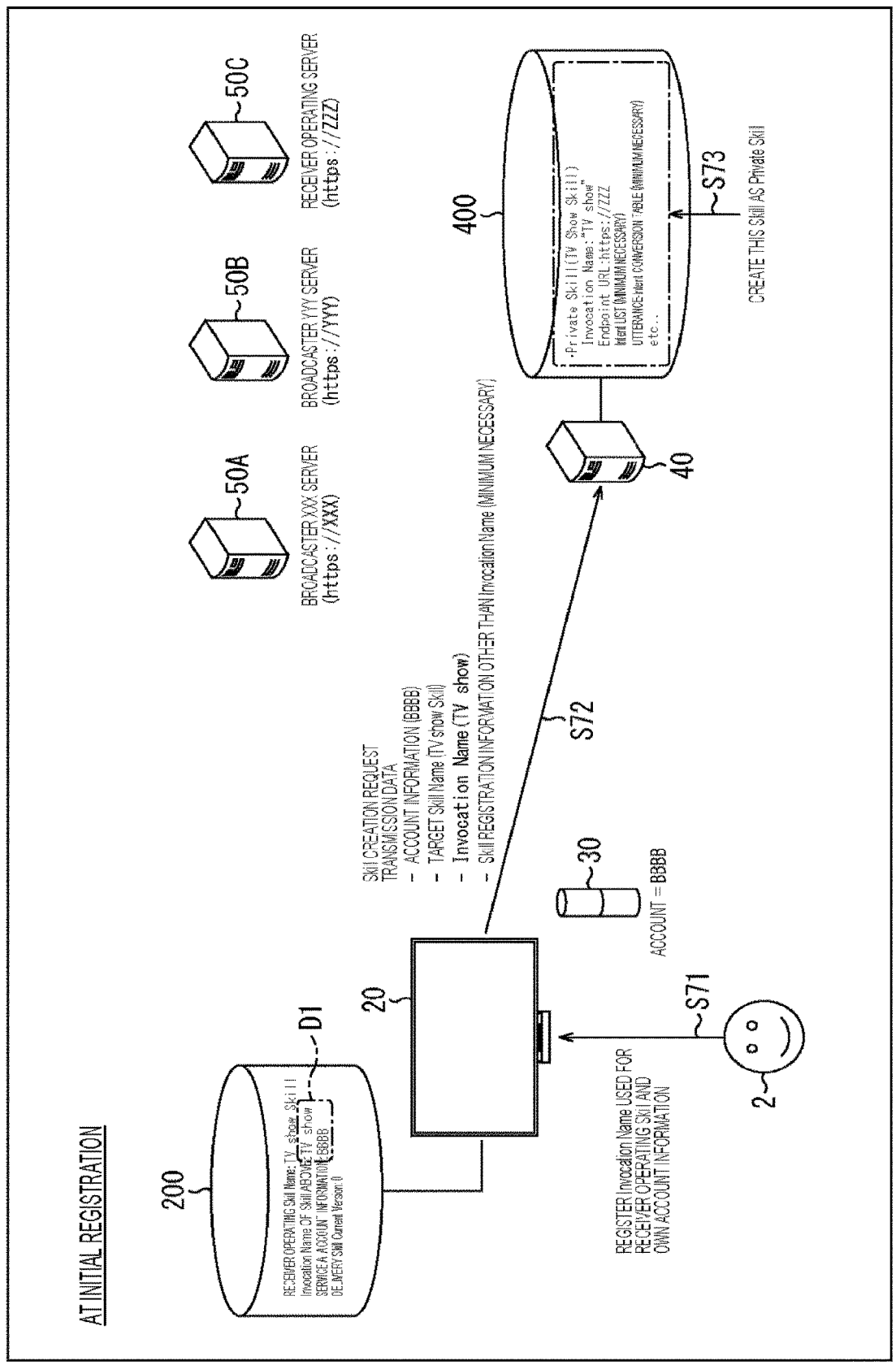
FIG. 17 is a diagram illustrating a first example of the configuration of a third embodiment.

FIG. 17 shows a configuration at the time of initial registration as a first example of the configuration of the third embodiment.

At the time of initial registration, the viewer 2 registers the invocation name used for a receiver operating skill and the viewer's own account information in the reception apparatus 20 (S71).

Thus, in the reception apparatus 20, the recording unit 200 registers the invocation name "TV show" and the account information "BBBB" for the receiver operating skill (skill name: TV show Skill) in response to the settings input by the viewer 2 (D1). In addition, the recording unit 200 records the current version (initial value: 0) of a delivery skill delivered from the broadcast delivery system 10.

Moreover, the viewer 2, when using the content-voice AI cooperation system 1, has the account information ("BBBB") of a service A that provides the voice AI assistance service using the voice-user interface device 30 as the user interface. At the time of initial registration, the viewer 2 is able to register the account information ("BBBB") of the service A.

Specifically, for example, in a case of using Alexa (registered trademark) installed in Amazon Echo (registered trademark), which is a typical voice AI assistance service, the viewer 2 is able to register it by using the pre-registered account information of Amazon.com (registered trademark).

The reception apparatus 20 transmits a skill creation request to the voice assistance server 40 via the Internet 60 on the basis of contents of the settings input by the viewer 2 (S72).

This skill creation request is capable of including, in addition to the account information "BBBB", the skill name "TV show Skill", and the invocation name "TV show", skill registration information other than the invocation name as transmission data. However, the skill registration information sent at this time of initial registration is assumed to be limited to the minimum necessary information.

The voice assistance server 40 generates a private skill on the basis of the skill creation request (transmission data included therein) from the reception apparatus 20 and records the private skill in the recording unit 400 (S73).

This private skill is a skill linked to the account information "BBBB", and the skill name is "TV show Skill". The skill information includes an intent list, an utterance-intent conversion table, or the like in addition to the invocation name "TV show" and the endpoint URL "https://ZZZ".

In this description, the intent list is a list of intents that perform processing corresponding to the result obtained by analyzing the voice data of the utterance of the viewer 2 (e.g., such as the intention or desire of the viewer 2). In other words, the skill (private skill) fulfills the request of the viewer 2 by performing processing corresponding to the intent. In addition, an utterance-intent conversion table is a table in which utterance and intent are associated with each other, and the use of the table makes it possible for the utterances of the viewer 2 to be converted into intent.

However, at the time of initial registration, only the minimum necessary information is registered in the intent list or the utterance-intent conversion table. In addition, in this example, the description is given that the endpoint URL, the intent list, and the utterance-intent conversion table are included in the generated private skill, but other information can be included.

In this way, at the initial registration stage, a skill for broadcast-accompanying application use is generated (automatic registration generation) as a private skill linked to the count information ("BBBB") assigned to the voice-user interface device 30. However, at the initial registration stage, the information other than the invocation name ("TV show") is the minimum necessary information for the skill information, so to speak, it can be said that the first one skill (private skill) is created in advance on the premise of updating.

First Example of Configuration at Viewing

Figure 18:
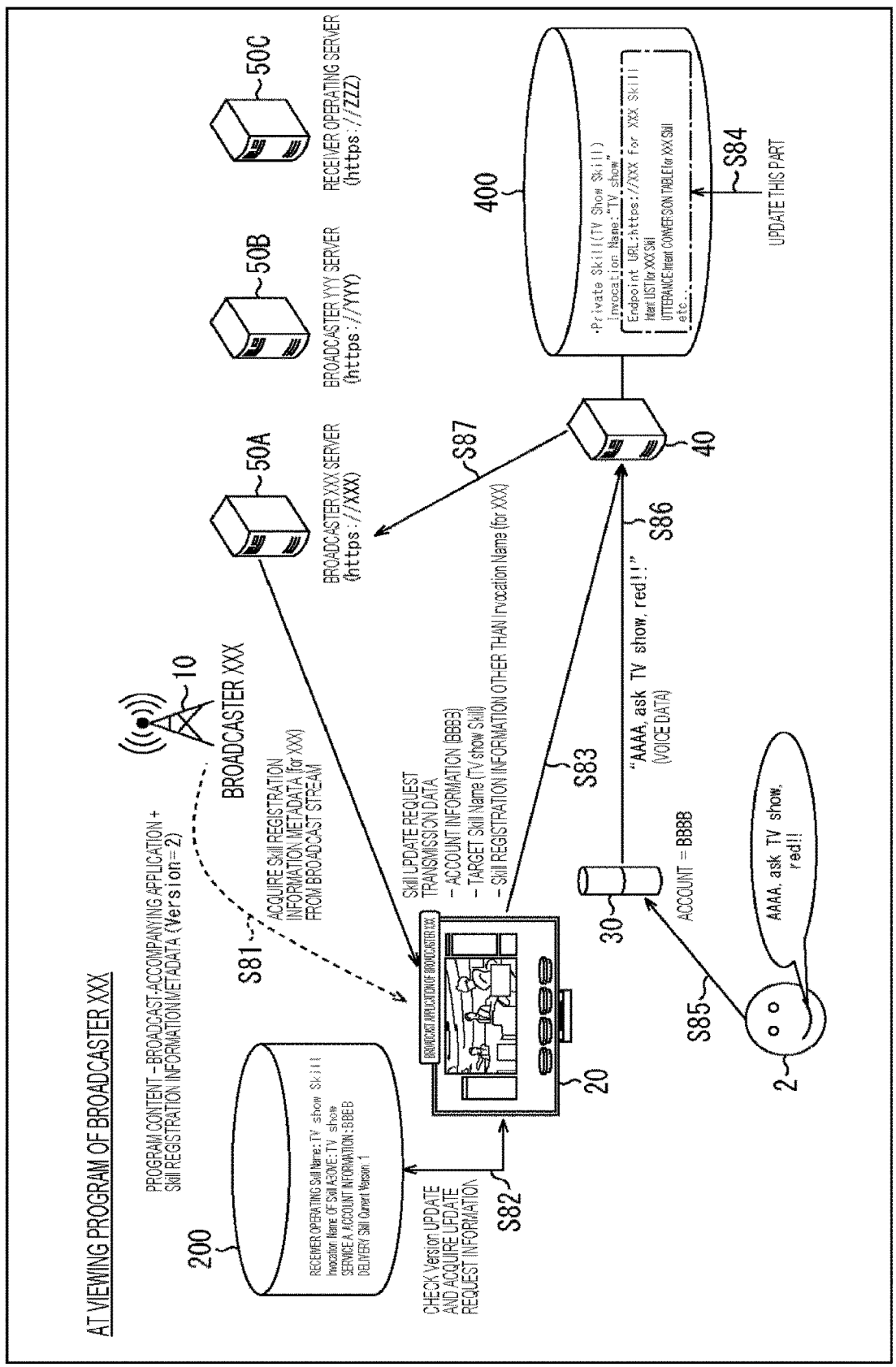
FIG. 18 is a diagram illustrating a second example of the configuration of the third embodiment.

FIG. 18 shows a first example of the configuration at the time of viewing as the second example of the configuration of the third embodiment.

In FIG. 18, the reception apparatus 20 receives a broadcast stream transmitted from the broadcast delivery system 10, and plays back content such as a broadcast program, or executes a broadcast-accompanying application. However, metadata used for notifying of skill registration information (hereinafter referred to as "skill registration information metadata") is inserted in the broadcast stream.

Moreover, although details will be described later, the skill registration information metadata can be sent using EventStream or the like of an MPD. In addition, the invocation name "TV show" and the account information "BBBB" are registered in the recording unit 200 for the receiver operating skill (skill name: TV show Skill) by the processing at the time of initial registration illustrated in FIG. 17. In addition, the current version of the delivery skill is 1.

For example, when the viewer 2 is watching the quiz program of the broadcaster XXX, the reception apparatus 20 is executing the broadcast-accompanying application of the broadcaster XXX in conjunction with the quiz program of the broadcaster XXX. In addition, in this case, the reception apparatus 20 acquires the skill registration information metadata for the broadcaster XXX from the broadcast stream in conformity to the quiz program of the broadcaster XXX being viewed (S81).

The reception apparatus 20 determines whether to update the receiver operating skill on the basis of the acquired skill registration information metadata for the broadcaster XXX (S82). In the first example, the current version of the delivery skill recorded in the recording unit 200 is 1, but the version of the acquired delivery skill of the broadcaster XXX is 2, so the version is increased. Thus, the reception apparatus 20 transmits the skill update request to the voice assistance server 40 via the Internet 60 (S83).

This skill update request is capable of including, as transmission data, the account information "BBBB", the skill name "TV show Skill", and skill registration information other than the invocation name. For example, it is possible for the skill registration information to include the updated endpoint URL, the intent list, and the utterance-intent conversion table. However, the skill registration information sent in this stage corresponds to the information (skill registration information of the broadcaster XXX) obtained from the skill registration information metadata for the broadcaster XXX.

Moreover, here, the description is given that, when the version of the delivery skill is updated, the skill update request is issued to update the private skill. However, the update timing of the private skill is not limited thereto. For example, the update timing can be timing in the case where the channel is switched to another broadcast station by the operation of a remote controller of the viewer 2 or the case where the power of the reception apparatus 20 is turned on (the case where frequency band (channel) is adjusted).

The voice assistance server 40 updates the private skill (a part thereof) recorded in the recording unit 400 on the basis of the skill update request (transmission data included therein) from the reception apparatus 20 (S84).

In this example, although the private skill is registered in the recording unit 400 by the processing at the time of initial registration illustrated in FIG. 17, information other than the invocation name of this private skill can be updated with the skill registration information of the broadcaster XXX sent as the transmission data of the skill update request. Specifically, in the first example, in the recording unit 400, the endpoint URL is updated from "https://ZZZ" to "https://XXX". In addition, for example, the intent list is updated to the intent list of the skill for the broadcaster XXX, and the utterance-intent conversion table is updated to the utterance-intent conversion table of the skill for the broadcaster XXX.

In addition, the first example assumes that the viewer 2 uses the skills provided by the broadcaster XXX to participate in the quiz program of the broadcaster XXX being viewed. In this case, the viewer 2 utters, for example, "AAAA, ask TV show, red!!" to the voice-user interface device 30 and tells the viewer's own answer for the given quiz (S85).

The voice-user interface device 30 transmits the voice data of the utterance "AAAA, ask TV show, red!!" to the voice assistance server 40 (S86).

The voice assistance server 40 converts the voice data of the utterance from the voice-user interface device 30 into text data and specifies the target skill (private skill). In the example of FIG. 18, the voice data of the utterance includes the invocation name "TV show", so the private skill ("TV Show Skill") linked to the account information ("BBBB") of the viewer 2 is specified. Then, the text data of the utterance is passed as a parameter to the private skill being executed ("TV Show Skill").

In this example, the URL https://XXX, that is, the URL of the broadcaster XXX server 50A, is set as the endpoint URL of the private skill ("TV Show Skill""), so the private skill executed in the voice assistance server 40 notifies the broadcaster XXX server 50A of a request message. Thus, the private skill linked to the account information of the viewer 2 (e.g., the processing on an answer for the quiz, "red") is processed and the processing result is presented (S87). In this event, for example, the private skill is capable of cooperating with the broadcast-accompanying application of the broadcaster XXX to incorporate the processing result in the contents presented by the broadcast-accompanying application, as described above.

In this way, the viewer 2 is able to participate in the quiz program being watched, but here, when using the private skill linked to the account information of the viewer 2, it is possible to interact with the private skill by uttering the invocation name "TV show" to the voice-user interface device 30.

Second Example of Configuration at Viewing

Figure 19:
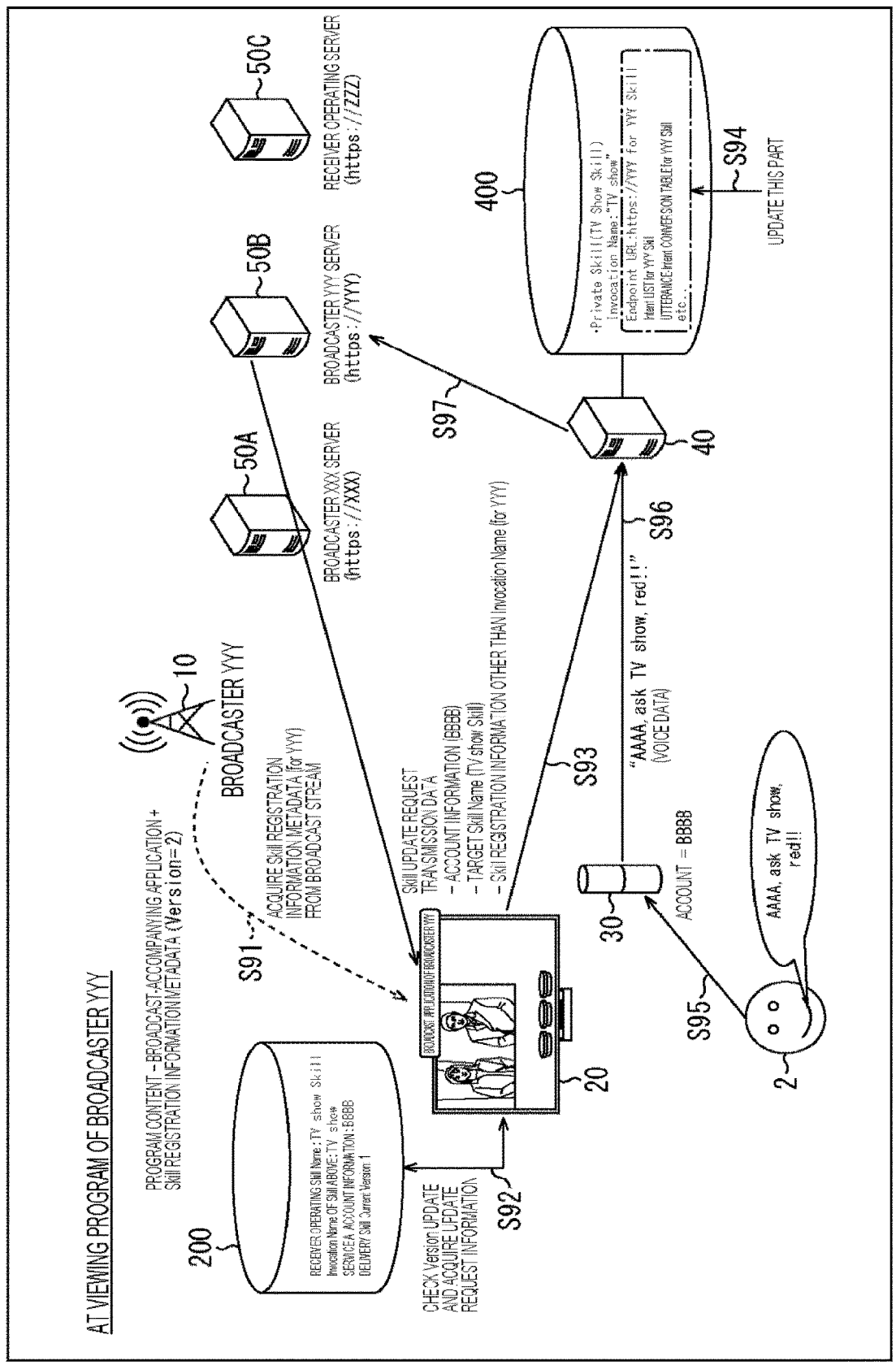
FIG. 19 is a diagram illustrating a third example of the configuration of the third embodiment.

FIG. 19 shows a second example of the configuration at the time of viewing as the third example of the configuration of the third embodiment.

In FIG. 19, for example, when the viewer 2 is watching the information program of the broadcaster YYY, the reception apparatus 20 is executing the broadcast-accompanying application of the broadcaster YYY in conjunction with the information program of the broadcaster YYY. In addition, in this case, the reception apparatus 20 acquires the skill registration information metadata for the broadcaster YYY from the broadcast stream in conformity to the information program of the broadcaster YYY being viewed (S91).

The reception apparatus 20 determines whether to update the receiver operating skill on the basis of the acquired skill registration information metadata for the broadcaster YYY (S92), and in the second example, the version of the acquired delivery skill of the broadcaster YYY is 2, so the version is increased. Thus, the reception apparatus 20 transmits the skill update request to the voice assistance server 40 via the Internet 60 (S93).

This skill update request is capable of including, as transmission data, the account information "BBBB", the skill name "TV show Skill", and skill registration information other than the invocation name. However, the skill registration information sent in this stage corresponds to the information (skill registration information of the broadcaster YYY) obtained from the skill registration information metadata for the broadcaster YYY.

The voice assistance server 40 updates the private skill (a part thereof) recorded in the recording unit 400 on the basis of the skill update request from the reception apparatus 20 (S94). Specifically, in the second example, in the recording unit 400, the endpoint URL is updated from "https://ZZZ" to https://YYY, the intent list is updated to the intent list of the skill for the broadcaster YYY, and the utterance-intent conversion table is updated to the utterance-intent conversion table of the skill for the broadcaster YYY.

In this description, the second example assumes that the viewer 2 uses the skills provided by the broadcaster YYY to participate in the information program of the broadcaster YYY being viewed. In this regard, the viewer 2 utters, for example, "AAAA, ask TV show, red!!" to the voice-user interface device 30 and, for example, replies to the game with an answer, or the like (S95).

The voice-user interface device 30 transmits the voice data of the utterance "AAAA, ask TV show, red!!" to the voice assistance server 40 (S96).

The voice assistance server 40 converts the voice data of the utterance from the voice-user interface device 30 into text data and specifies the target skill (private skill). In the example of FIG. 19, the voice data of the utterance includes the invocation name "TV show", so the private skill ("TV Show Skill") linked to the account information ("BBBB") of the viewer 2 is specified. Then, a parameter (text data of the utterance) is passed to the private skill being executed ("TV Show Skill").

In this example, the URL "https://YYY", that is, the URL of a broadcaster YYY server 50B is set as the endpoint URL of the private skill ("TV Show Skill"), so the voice assistance server 40 notifies the broadcaster YYY server 50B of a request message. Thus, the private skill (e.g., the processing on a reply or the like for the game, "red") is processed and the processing result is presented. In this event, for example, the private skill is capable of cooperating with the broadcast-accompanying application of the broadcaster YYY to incorporate the processing result in the contents presented by the broadcast-accompanying application, as described above.

In this way, the viewer 2 is able to participate in the information program being watched, but here, when using the private skill linked to the account information of the viewer 2, it is possible to interact with the private skill by uttering the invocation name "TV show" to the voice-user interface device 30.

Example of Detailed Configuration of Each Device

Figure 20:
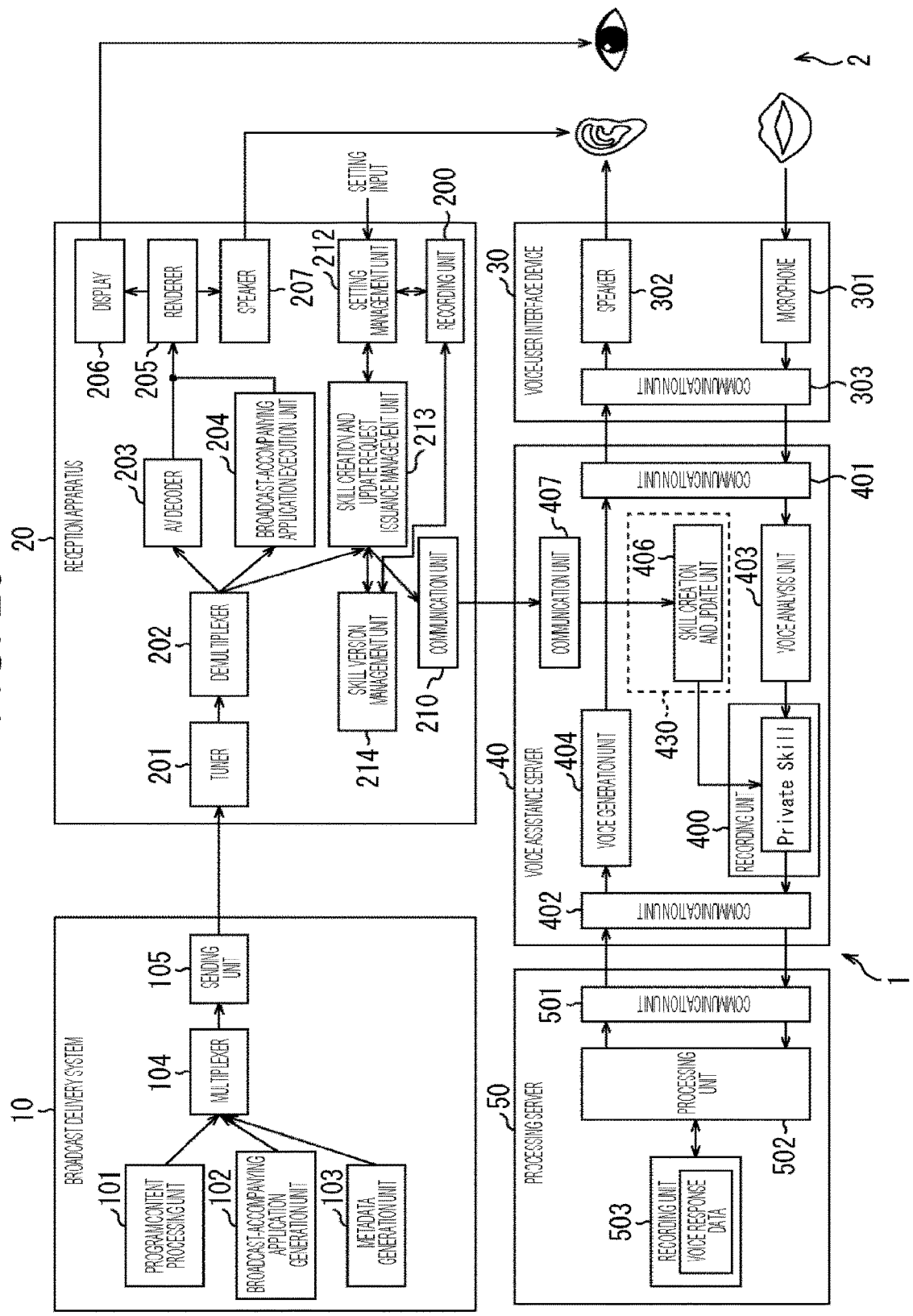
FIG. 20 is a block diagram illustrating an example of a detailed configuration of each device according to the third embodiment.

FIG. 20 is a block diagram illustrating an example of a detailed configuration of each device according to the third embodiment.

FIG. 20 illustrates an example of the configuration of the broadcast delivery system 10 on the transmitting side and the reception apparatus 20 on the receiving side and an example of the configuration of the voice-user interface device 30 on the local side and the voice assistance server 40 and the processing server 50 on the cloud side, which is similar to FIG. 8.

Moreover, in FIG. 20, the broadcast delivery system 10 and the processing server 50 are similar in configuration to those illustrated in FIG. 8, and so the description thereof is omitted. However, in the third embodiment, the broadcast delivery system 10 is necessary to deliver the skill registration information metadata. Thus, the metadata generation unit 103 generates skill registration information metadata instead of the invocation name metadata.

In FIG. 20, the reception apparatus 20 includes, in addition to the recording unit 200 (FIGS. 17 to 19), a tuner 201, a demultiplexer 202, an AV decoder 203, a broadcast-accompanying application execution unit 204, a renderer 205, a display 206, a speaker 207, a communication unit 210, a setting management unit 212, a skill creation and update request issuance management unit 213, and a skill version management unit 214.

In other words, in the reception apparatus 20 illustrated in FIG. 20, the setting management unit 212, the skill creation and update request issuance management unit 213, and the skill version management unit 214 are provided instead of the invocation name management unit 208 and the invocation name conversion unit 209, as compared with the configuration illustrated in FIG. 8.

The setting management unit 212 makes various settings in accordance with the settings input from the viewer 2. In this description, for example, the invocation name of the receiver operating skill, account information, and the like are set and recorded in the recording unit 200. Moreover, the settings in this description can be input, for example, not only by the operation input of the viewer 2 using a remote controller, a button, a touch panel (not shown), or the like but also by the voice input of the viewer 2 via the voice-user interface device 30.

The skill creation and update request issuance management unit 213 generates a skill creation request on the basis of information such as setting information that is set by the setting management unit 212 and skill registration information (limited to the minimum necessary information). This skill creation request is transmitted from the communication unit 210 to the voice assistance server 40 via the Internet 60.

Further, the skill creation and update request issuance management unit 213 generates a skill update request on the basis of the skill registration information metadata supplied from the demultiplexer 202 and the information such as the skill name and the account information acquired from the setting management unit 212. This skill update request is transmitted from the communication unit 210 to the voice assistance server 40 via the Internet 60.

The skill version management unit 214 manages the current version of the delivery skill in accordance with the instruction from the skill creation and update request issuance management unit 213. This version information is recorded in the recording unit 200.

Moreover, the communication unit 210 is, for example, configured as a communication module compatible with wireless communication such as wireless LAN or cellular communication, or wired communication, and communicates with the voice assistance server 40 (the communication unit 407 thereof) via the Internet 60 in accordance with a predetermined communication scheme to exchange various data.

In FIG. 20, the voice-user interface device 30 includes a microphone 301, a speaker 302, and a communication unit 303. Specifically, the voice-user interface device 30 illustrated in FIG. 20 does not include the voice analysis unit 304, the communication unit 305, and the setting management unit 306, as compared with the configuration illustrated in FIG. 8.

Further, in FIG. 20, the voice assistance server 40 includes, in addition to the recording unit 400 (FIGS. 17 to 19), a communication unit 401, a communication unit 402, a voice analysis unit 403, a voice generation unit 404, a skill creation and update unit 406, and a communication unit 407. Specifically, the voice assistance server 40 illustrated in FIG. 20 is provided with the skill creation and update unit 406 and the communication unit 407 additionally as compared with the configuration illustrated in FIG. 8. In addition, the recording unit 400 has the created or updated private skill (Private Skill) recorded therein instead of the plurality of skills (Skill_1 to Skill_N).

The skill creation and update unit 406 generates a private skill on the basis of the skill creation request transmitted from the reception apparatus 20. This private skill (a program) is recorded in the recording unit 400. In addition, the skill creation and update unit 406 updates (replaces) the contents of the private skill recorded in the recording unit 400 on the basis of the skill update request transmitted from the reception apparatus 20.

The private skill (a program) is read from the recording unit 400 and is executed by a CPU (such as a CPU 1001 in FIG. 25 described later). The private skill being executed creates a request message on the basis of a parameter (text data of the utterance) received from the voice analysis unit 403. The request message is transmitted through the communication unit 402 to the processing server 50 via the network 70.

Moreover, in the voice assistance server 40, the skill creation and update unit 406 constitutes a processing unit 430 that generates the private skill and updates the generated private skill.

The communication unit 407 is configured as a communication module compatible with wireless communication or wire communication and performs communication with the reception apparatus 20 (the communication unit 210 thereof) via the Internet 60 in accordance with a predetermined communication scheme to exchange various data. Moreover, in FIG. 20, the communication unit 407 is described as a communication module different from the communication unit 401 and the communication unit 402 for the convenience of description, but they can be integrated into one communication module.

Processing Procedure in Each Device

Figure 21:
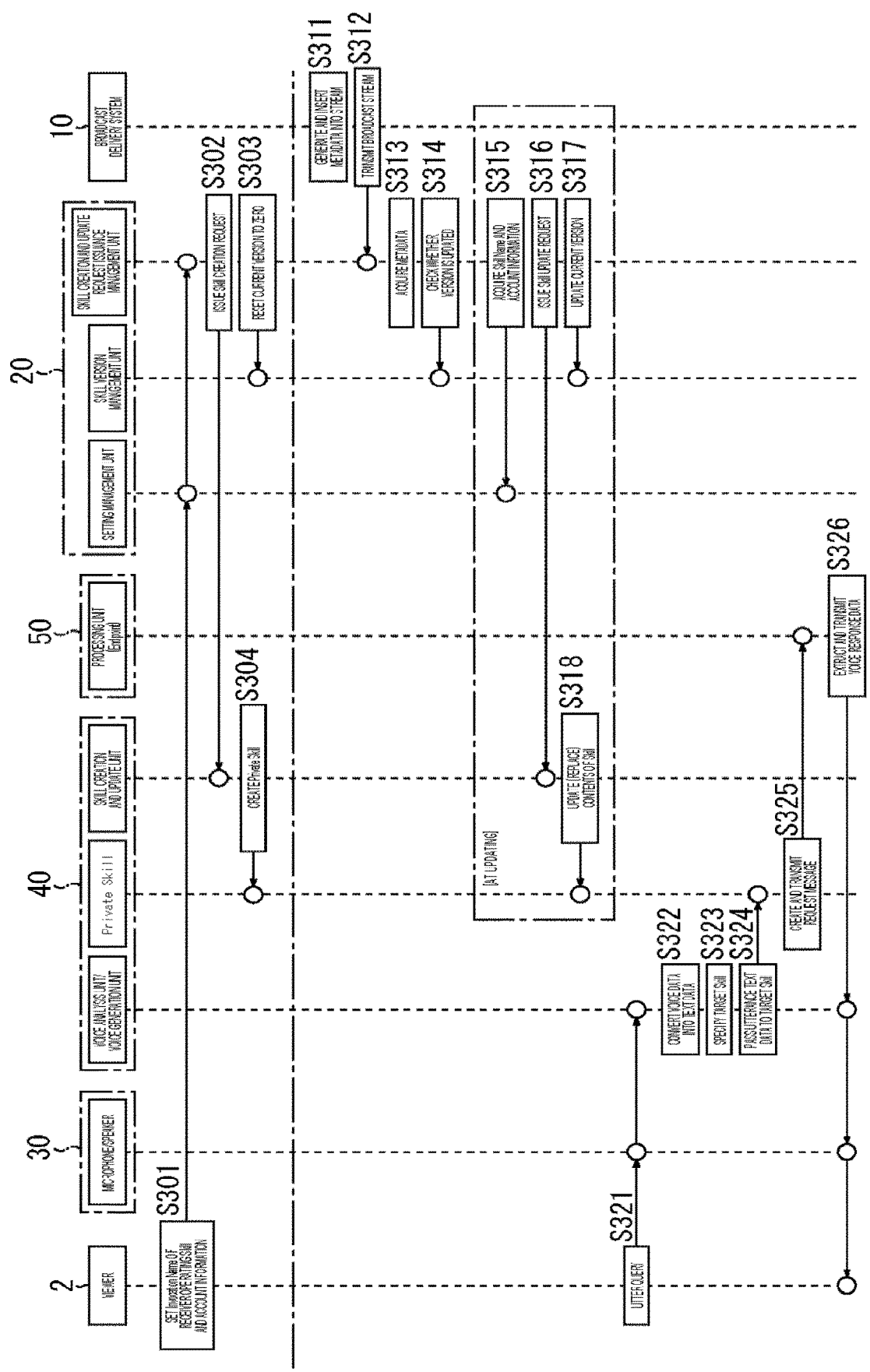
FIG. 21 is a flowchart illustrated to describe the processing procedure in each device according to the third embodiment.

The processing procedure in each device of the third embodiment is now described with reference to the flowchart of FIG. 21.

The processing of steps S301 to S304 is first executed at the time of initial registration. Specifically, the settings input by the viewer 2 are accepted by the reception apparatus 20, and the processing of steps S301 to S303 is executed.

In other words, in the reception apparatus 20, the setting management unit 212 sets the invocation name of the receiver operating skill and the account information in accordance with the instruction from the viewer 2 (S301). In this stage, for example, the invocation name "TV show" and the account information "BBBB" can be set for the receiver operating skill (skill name: TV show Skill).

Further, the skill creation and update request issuance management unit 213 issues a skill creation request to the voice assistance server 40 on the basis of the setting information and skill registration information (limited to the minimum necessary information) that are set by the setting management unit 212 (S302). In addition, the skill version management unit 214 resets the current version of the delivery skill to 0 in accordance with the instruction from the skill creation and update request issuance management unit 213 (S303).

The voice assistance server 40 receives the skill creation request via the Internet 60 and executes the processing of step S304.

In other words, the skill creation and update unit 406 generates a private skill on the basis of the skill creation request received from the reception apparatus 20 (S304). This private skill (a program) is recorded in the recording unit 400, for example, and can be executed by the CPU or the like.

In a case where the private skill is updated after the initial registration is performed, the processing of steps S311 to S318 is executed. Moreover, here, the description is given that the private skill is updated when the version of the delivery skill is updated, but the updating can be performed, for example, when the channel is switched to another broadcast station, as described above.

In other words, in the broadcast delivery system 10, the metadata generation unit 103 generates skill registration information metadata, and the multiplexer 104 inserts the generated skill registration information metadata into the stream (S311).

In this stage, for example, in the case where the content is delivered as a stream compliant to MPEG-DASH, it is possible to transmit the skill registration information metadata using the MPD that is the control information thereof.

Figure 22:
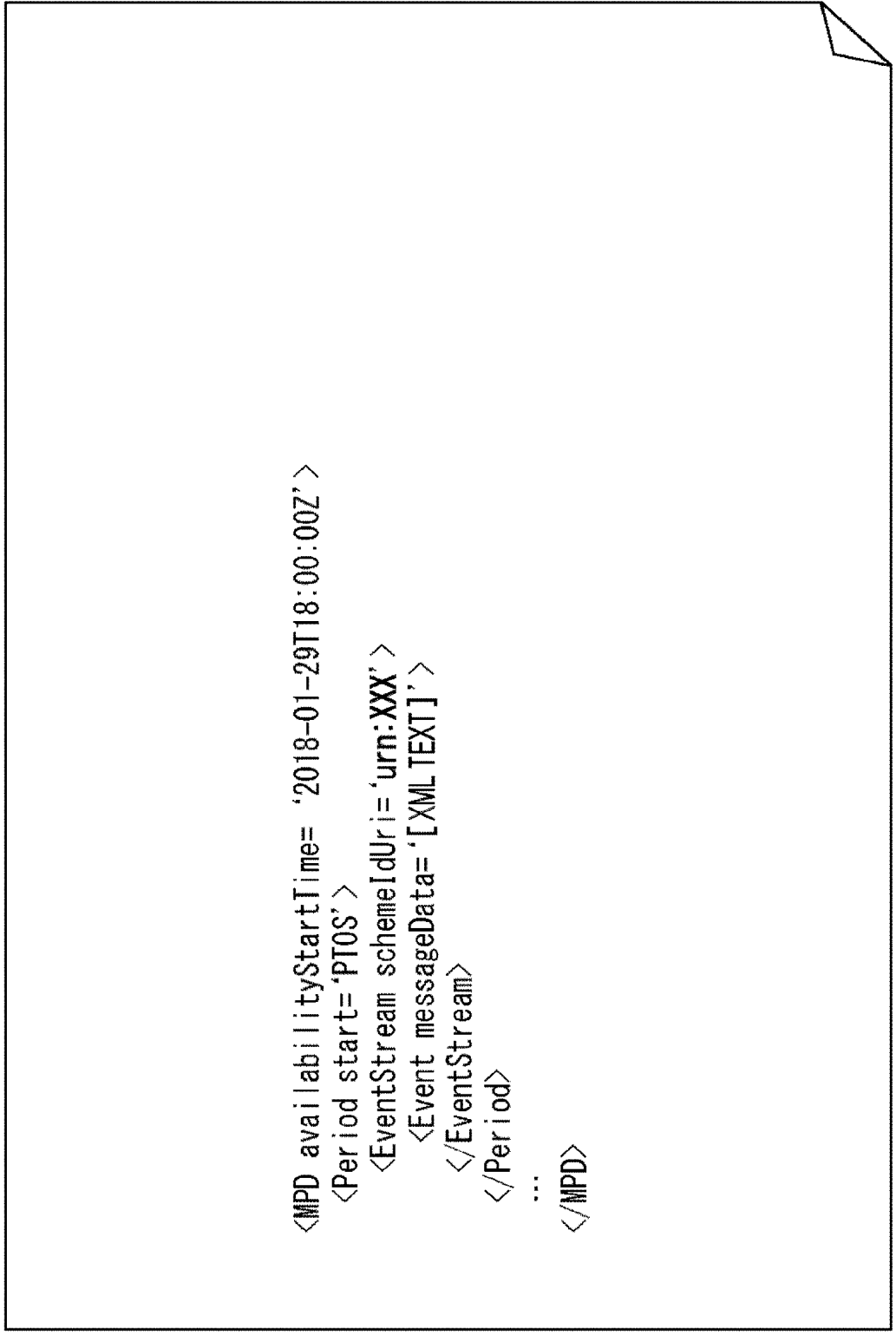
FIG. 22 is a diagram illustrating an example of a description of an MPD.

FIG. 22 shows an example of inserting skill registration information metadata into the MPD.

As described above, MPD includes the element Period in its hierarchical structure, and the element EventStream can be described in the element Period. In addition, in the element EventStream, as its attribute, an attribute schemeIdUri indicating a URI used for identifying the scheme can be described. In the MPD description example of FIG. 22, 'urn:XXX' is defined as the URI that identifies the scheme used for transmitting the skill registration information metadata for the broadcaster XXX and is described as the attribute value of the attribute schemeIdUri.

Further, the element Event can be described for the element EventStream. It is possible to describe an attribute messageData in which the data of the event message is specified as the attribute of the element Event. In the MPD description example of FIG. 22, the skill registration information metadata for the broadcaster XXX in extensible markup language (XML) format ('XML text' in the figure) is described as the attribute value of the attribute messageData of the element Event.

FIG. 23 shows an example of a description of skill registration information metadata for the broadcaster XXX in an XML format.

In FIG. 23, as the skill registration information of the broadcaster XXX, for example, the version of the delivery skill of the broadcaster XXX that is "1" is described as a version attribute of an element SkillRegistrationInfo. In addition, the invocation name "XXX Quiz" is described between the start tag and end tag of an element InvocationName, and the endpoint URL "http://XXX" is described between the start tag and end tag of an element EndpointUrl. Furthermore, as other skill registration information, for example, information or the like relating to intent or a slot (a parameter) is described by elements of Intent, SlotValues, or the like.

Moreover, although the element Event can describe an attribute presentationTime and an attribute duration as its attributes, here, the skill registration information metadata described as the attribute value of an attribute messageData is assumed to be typically valid without using these attributes.

Referring back to FIG. 21, in step S312, the sending unit 105 transmits the broadcast stream in which the skill registration information metadata is inserted. The reception apparatus 20 receives this broadcast stream, and the processing of steps S313 to S317 are executed thereon.

In step S313, the skill creation and update request issuance management unit 213 acquires skill registration information metadata obtained from the stream separated by the demultiplexer 202.

In step S314, the skill creation and update request issuance management unit 213 checks whether the version is updated by inquiring the skill version management unit 214. In this stage, the processing in the case where it is determined that the version is updated in the processing of step S314 is shown in steps S315 to S318.

In step S315, the skill creation and update request issuance management unit 213 acquires the skill name of the receiver operating skill and the account information of the viewer 2 by inquiring the setting management unit 212.

In step S316, the skill creation and update request issuance management unit 213 issues a skill update request to the voice assistance server 40 on the basis of the skill registration information metadata acquired from the broadcast stream and the skill name and account information acquired from the setting management unit 212.

In step S317, the skill version management unit 214 updates the current version of the delivery skill in accordance with the instruction from the skill creation and update request issuance management unit 213. In this description, for example, the current version is incremented from 0 to 1.

The voice assistance server 40 receives the skill update request via the Internet 60 and executes the processing of step S318.

In step S318, the skill creation and update unit 406 updates (replaces) the contents of the private skill linked to the account information of the viewer 2 on the basis of the skill update request received from the reception apparatus 20. The updated private skill (a program) is recorded, for example, in the recording unit 400, and is executed by a CPU (e.g., such as the CPU 1001 in FIG. 25 described later).

Moreover, although the description is given of the case where the version of the delivery skill is updated and the private skill is updated, in a case where the version of the delivery skill is not updated, the processing at the time of updating of steps S315 to S318 is skipped. The private skill is not updated, and, for example, the private skill before the update is executed as it is.

Then, when the viewer 2 utters a question, the processing operations of step S321 and subsequent steps are executed. In other words, in the voice-user interface device 30, the utterance of the viewer 2 picked up by the microphone 301 is sent to the voice assistance server 40 (S321), and the voice analysis unit 403 converts the voice data of the utterance into text data (S322).

Further, the voice analysis unit 403 specifies a target skill (private skill) among the skills recorded in the recording unit 400 on the basis of the analysis result of the voice data of the utterance (S323). In this regard, in the voice assistance server 40, the target private skill is executed by a CPU or the like, so the voice analysis unit 403 passes the converted target text data (parameter) of the utterance to the specified target skill (private skill) (S324).

The target private skill creates a request message on the basis of the text data of the utterance from the voice analysis unit 403 and sends it to the processing server 50 (the processing unit 502 thereof) specified by the endpoint URL (S325). The processing server 50 receives this request message via the network 70, and the processing of step S326 is executed.

In step S326, the data of the voice response to the query uttered by the viewer 2 is extracted and transmitted to the voice assistance server 40 via the network 70. This configuration allows the voice-user interface device 30 to output a response voice corresponding to the voice data from the voice assistance server 40 from the speaker 302. Thus, the viewer 2 is able to check the response voice corresponding to the viewer's own query utterance.

The above description is given, as the processing procedure of each device according to the third embodiment, of the procedure in the case where the voice assistance server 40 on the cloud side generates a private skill linked to the viewer's count information and updates the private skill (the real-time update) on the basis of the skill registration information metadata delivered via broadcasting.

As described above, in the third embodiment, there is the case where the processing unit 430 of the voice assistance server 40 uses the voice AI assistance service in cooperation with the content such as the broadcast program of the broadcaster XXX or the broadcaster YYY. The processing unit 430 generates the private skill (a personalized program) on the basis of the account information of the viewer 2 who views the content, the name of the private skill (a personalized program) specialized for the viewer that is a program that performs processing corresponding to the voice of the viewer's utterance, and skill registration information (generation information) including at least an invocation name (an invoking name) for invoking a personalized program. In addition, the processing unit 430 updates the generated private skill (personalized program) on the basis of update information including at least the account information, the name of the personalized program, and the skill registration information (update information) excluding the invoking name, which is information registered for the personalized program.

Further, in the processing unit 430, the processing corresponding to the voice uttered by the viewer 2 is performed by the private skill (a personalized program) associated with the invocation name (an invoking name) sent from the voice-user interface device 30. Thus, it can be said that the voice assistance server 40 is an information processing apparatus including the processing unit 430.

Moreover, the above description is given of the private skill, but the form of providing the private skill is not limited to those described in the above-mentioned embodiments. For example, in a device such as the voice assistance server 40, it is assumed that the universal skill is acquired (received), customized such as adding a speech pattern (e.g., such as accent) suitable for the target audience, and used as a private skill.

3. Modifications

Example of Other Configuration

The above description is given that the reception apparatus 20 and the voice-user interface device 30 are different devices. However, for example, as illustrated in FIG. 24, these devices can be integrated to form one device (an information processing apparatus).

Figure 24:
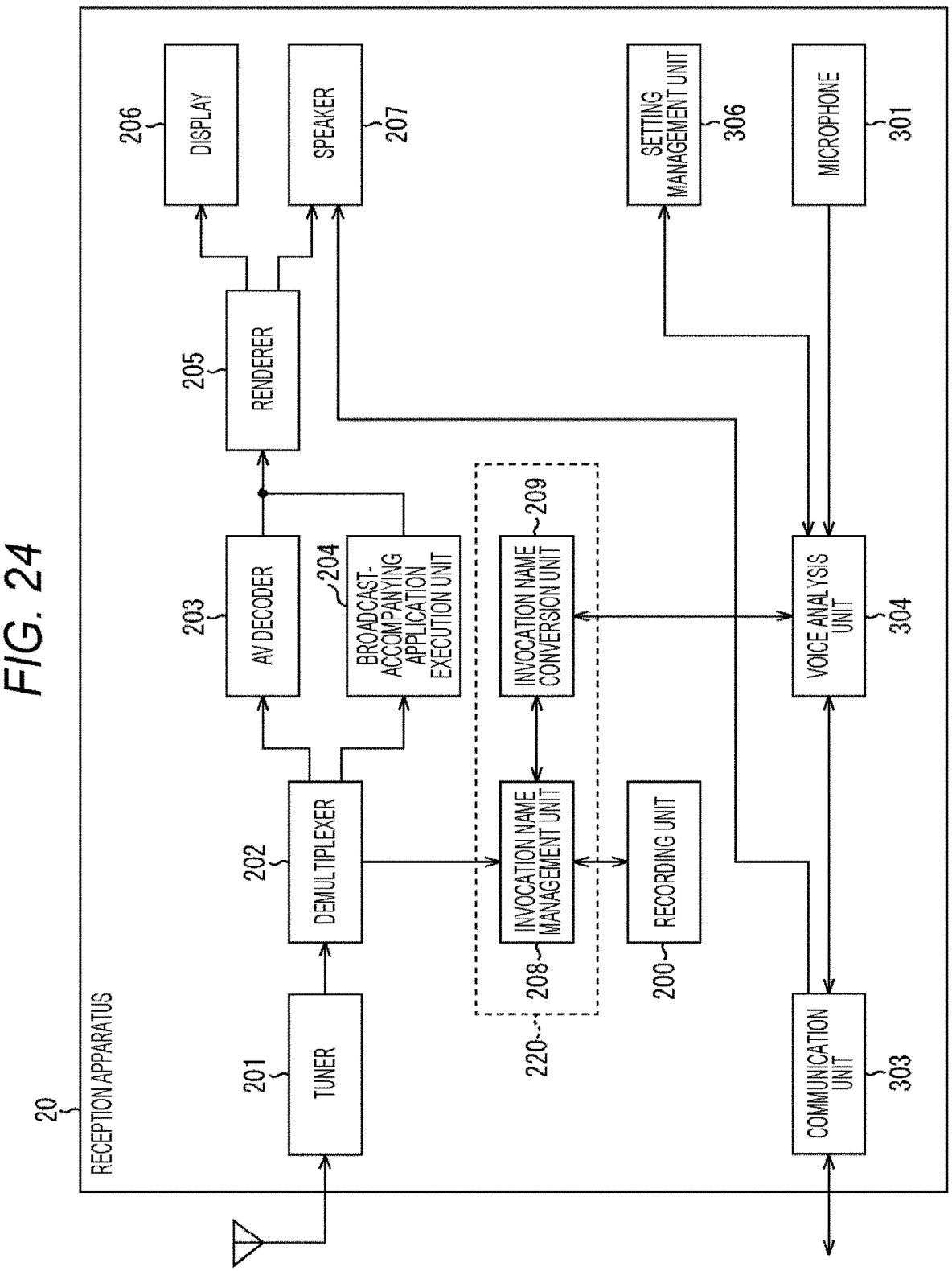
FIG. 24 is a block diagram illustrating an example of another configuration of a reception apparatus.

In other words, the reception apparatus 20 illustrated in FIG. 24 is a device such as a television set or a smartphone that supports the voice AI assistance service. The reception apparatus 20 includes, in addition to a recording unit 200, and a tuner 201 to an invocation name conversion unit 209, a microphone 301, a communication unit 303, a voice analysis unit 304, and a setting management unit 306 on the side of the voice-user interface device 30. However, in FIG. 24, the speaker 207 is also used as the speaker 302 on the side of the voice-user interface device 30.

In the reception apparatus 20 illustrated in FIG. 24, the invocation name management unit 208 and the invocation name conversion unit 209 also constitute the processing unit 220. The processing unit 220 allows the processing for converting the universal invocation into the operational invocation name to be performed on the basis of the registration list and the invocation name metadata recorded in the recording unit 200.

Moreover, the configuration in which the reception apparatus 20 is compatible with the voice AI assistance service is described with reference to FIG. 24. However, the recording unit 200 and the processing unit 220 (the entirety or a part of functions thereof) are provided on the side of the voice-user interface device 30, and the necessary information can be acquired from the side of the reception apparatus 20. In addition, although the configuration corresponding to the first embodiment is illustrated in FIG. 24, the reception apparatus 20 and the voice-user interface device 30 can be integrated, which is similar to the second and third embodiments.

Further, as the function for providing the voice AI assistance service, there are functions on the local side (e.g., such as the function of the voice analysis unit 304) and functions on the cloud side (e.g., such as functions of the voice analysis unit 403 and the voice generation unit 404). However, all of those functions can be implemented in a device (a terminal) on the local side or a device (a server) on the cloud side, or some of those functions can be implemented in a device (a terminal) on the local side or a device (a server) on the cloud side.

Further, in the content-voice AI cooperation system 1 of FIG. 1 described above, the case where one reception apparatus 20 (e.g., a television set) and one voice-user interface device 30 (a smart speaker) are installed in the viewer's house is illustrated. However, for example, it is possible to provide the reception apparatus 20 and the voice-user interface device 30 to which the present technology is applied for each viewer's house. In addition, although it is assumed that the reception apparatus 20 and the voice-user interface device 30 are installed in the same room at the viewer's house, they can be installed in different rooms. Furthermore, a plurality of voice-user interface devices 30 can be provided for one reception apparatus 20, or conversely, a plurality of reception apparatuses 20 can be provided for one voice-user interface device 30.

Furthermore, in the content-voice AI cooperation system 1 of FIG. 1 described above, the case where one voice assistance server 40 and one processing server 50 are installed is illustrated, but, for example, a plurality of these servers can be installed for each function or provider (e.g., broadcaster). On the other hand, the entirety or a part of the functions of the voice assistance server 40 and the processing server 50 can be integrated and provided by one or a plurality of servers.

Example of Broadcasting System

As a broadcasting system for transferring a broadcasting signal (a digital broadcasting signal) sent from the broadcast delivery system 10 to the reception apparatus 20, for example, it is possible to apply advanced television systems committee (ATSC) that is a system adopted in the United States or the like. In addition to that, it is possible to apply integrated services digital broadcasting (ISDB), which is a system employed by Japan and others, or digital video broadcasting (DVB), which is a system employed by European countries or the like. In addition, the transmission path is not limited to terrestrial broadcasting, and for example, it can also be applied to satellite broadcasting using broadcasting satellites (BS), communications satellites (CS), or the like or wire broadcast such as cable television (CATV).

Further, the above-described broadcast delivery system 10 includes one or a plurality of broadcast servers or the like. For example, in a general digital broadcast system, the multiplexer 104 (the multiplexer server) and the sending unit 105 (the sending server) can be installed in different places. More specifically, for example, the multiplexer 104 is installed in the broadcast station, while the sending unit 105 is installed in the transmitting station. Furthermore, the program content processing unit 101 (the program content server), the broadcast-accompanying application generation unit 102 (the broadcast-accompanying application server), and the metadata generation unit 103 (the metadata server) can be installed in the same location (e.g., a place inside the broadcast station) as the multiplexer 104 (the multiplexer server) or in different places (e.g., a place outside the broadcast station).

Example of Content Application

Moreover, in the above description, programs and Ads are exemplified as the content to be delivered, but content to which the present technology is applied includes not only moving images or music but also any types of content applications such as electronic books, games, and advertisements. In addition, in the above, the delivery via the broadcast by the broadcast delivery system 10 is described as the delivery route of the content, but a communication distribution system that provides over-the-top (OTT) services or the like can deliver streaming via communication. Furthermore, all components (e.g., such as video, audio, or subtitle) that includes content such as programs can be delivered via broadcasting or communication, or a part of the components can be delivered via broadcasting or communication (the remaining part is delivered via communication or broadcasting).

Further, the broadcast-accompanying application can be, for example, an application developed in a markup language such as HTML5 or a scripting language such as JavaScript (registered trademark), but is not limited thereto. For example, it can be an application developed in a programming language such as Java (registered trademark). In addition, the broadcast-accompanying application is not limited to applications executed by the browser (the broadcast-accompanying application execution unit 204), but can be executed as a so-called native application in an operating system (OS) environment or the like.

Furthermore, the above description is given of the case where the broadcast-accompanying application is delivered via broadcasting by the broadcast delivery system 10, it is not limited thereto. For example, an application server that generates the broadcast-accompanying application can deliver it via communication (via the Internet 60). In addition, the above description is given that the broadcast-accompanying application is in conjunction with the content delivered via broadcasting, but it can be an application executed in conjunction with the content delivered via communication.

Others

Moreover, the terms used herein are examples, and in practice, other terms are used in some cases. However, the difference in these terms is a formal difference, and the substantial contents of the objects are not different. For example, the above-mentioned "skill" is referred to as "action", "application", or the like in some cases. In addition, the skill can be provided as an application-programming interface (API), or a part of the functions thereof can be implemented by using API.

As a further illustration, for example, the above-mentioned "wake word" is referred to as "activation keyword", "command word", or the like, the above-mentioned "parameter" is referred to as "slot" or the like, and the above-mentioned "AI assistance service" is referred to as "AI assistant service" or the like, in some cases.

4. Configuration of Computer

A series of processes described above can be executed by hardware or software. In a case where a series of processes is executed by software, a program constituting the software is installed in a computer. FIG. 25 is a diagram illustrating an exemplary hardware configuration of a computer that executes a series of processing described above by a program.

In this computer 1000, a central processing unit (CPU) 1001, a read only memory (ROM) 1002, and a random access memory (RAM) 1003 are connected to one another by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The recording unit 1008 includes a hard disk, a nonvolatile memory, or the like. The communication unit 1009 includes a network interface or the like. The drive 1010 drives a removable recording medium 1011 such as a magnetic disk, an optical disk, a magneto-optical disk, or a semiconductor memory.

In the computer 1000 configured as described above, the CPU 1001 loads a program that is recorded in the ROM 1002 or the recording unit 1008 onto the RAM 1003 via the input/output interface 1005 and the bus 1004, and executes the program. Thus, the above-described series of processing is performed.

Programs to be executed by the computer 1000 (the CPU 1001) are provided being recorded in the removable recording medium 1011 which is a packaged medium or the like, for example. Also, programs may be provided via a wired or wireless transmission medium, such as a local area network, the Internet or digital satellite broadcasting.

In the computer 1000, the program can be installed on the recording unit 1008 via the input/output interface 1005 by mounting the removable recording medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

In addition, an embodiment of the present technology is not limited to the embodiments described above, and various changes and modifications may be made without departing from the scope of the present technology.

Additionally, the present technology may also be configured as below.

(1)

An information processing apparatus including:

a processing unit configured to process, in using a voice AI assistance service in cooperation with content, specific information associated with a universal invoking name included in a voice uttered by a viewer watching the content on the basis of the universal invoking name and association information, the universal invoking name being common to a plurality of programs that perform processing corresponding to the voice uttered by the viewer as an invoking name used for invoking the program, the association information being associated with the specific information to each of the programs.

(2)

The information processing apparatus according to (1), in which the association information associates the universal invoking name with an invoking name specific to each of the programs, and the processing unit converts the universal invoking name included in the voice uttered by the viewer into the specific invoking name on the basis of the association information.

(3)

The information processing apparatus according to (2), further including:

a recording unit having the association information recorded in advance, in which the processing unit converts the universal invoking name into the specific invoking name on the basis of the recorded association information.

(4)

The information processing apparatus according to (2), in which the information processing apparatus is configured as a reception apparatus configured to receive the content delivered via broadcasting, the specific invoking name is acquired from metadata delivered via broadcasting, and the processing unit converts the universal invoking name into the specific invoking name acquired from the metadata.

(5)

The information processing apparatus according to any one of (2) to (4), in which the information processing apparatus is configured as a reception apparatus configured to receive the content delivered via broadcasting, and converts the universal invoking name into the specific invoking name in response to a request from a voice processing device configured to function as a user interface of the voice AI assistance service.

(6)

The information processing apparatus according to (1), in which the association information is information obtained by associating metadata used for specifying the content being viewed by the viewer with a specific program and is included in a switching program specified by the universal invoking name, and the processing unit performs processing corresponding to the voice uttered by the viewer on the specific program associated with the metadata sent together with the universal invoking name on the basis of the association information being associated by the switching program.

(7)

The information processing apparatus according to (6), in which the information processing apparatus is configured as a server device connected via a network to a voice processing device configured to function as a user interface of the voice AI assistance service, and the processing unit dispatches to the specific program associated with the metadata sent together with the universal invoking name from the voice processing device.

(8)

The information processing apparatus according to (6) or (7), in which the metadata includes channel information indicating a channel of the content being viewed by the viewer and temporal information indicating a time corresponding to the utterance of the viewer on a playback time axis of the content.

(9)

The information processing apparatus according to any one of (1) to (8), in which the program includes at least information regarding what kind of voice is reacted, what function is implemented by using what kind of word as a parameter, or which server device or processing program practically executes the function, and performs processing corresponding to the voice uttered by the viewer sent from a voice processing device configured to function as a user interface of the voice AI assistance service on the basis of the information.

(10)

The information processing apparatus according to (4), in which the content is delivered via broadcasting as a stream compliant to MPEG-DASH, and the specific invoking name is delivered via broadcasting using an MPD.

(11)

The information processing apparatus according to (7) or (8), in which the channel information and the temporal information are sent via communication together with voice data uttered by the viewer using an HTTP request.

(12)

The information processing apparatus according to any one of (1) to (11), in which the content is broadcast content delivered via broadcasting, and the program is provided for each broadcaster or broadcast program.

(13)

An information processing method executed by an information processing apparatus, the method including:

processing, by the information processing apparatus, in using a voice AI assistance service in cooperation with content, specific information associated with a universal invoking name included in a voice uttered by a viewer watching the content on the basis of the universal invoking name and association information, the universal invoking name being common to a plurality of programs that perform processing corresponding to the voice uttered by the viewer as an invoking name used for invoking the program, the association information being associated with the specific information to each of the programs.

(14)

A transmission apparatus including:

a generation unit configured to generate metadata including a specific invoking name in using a universal invoking name and association information in a voice AI assistance service in cooperation with content, the universal invoking name being common to a plurality of programs that perform processing corresponding to a voice uttered by the viewer watching the content as an invoking name used for invoking the program, the association information being associated with the specific invoking name to each of the programs; and a transmission unit configured to transmit the generated metadata.

(15)

The transmission apparatus according to (14), in which the generation unit generates an MPD described in an identifiable expression by identification information used for identifying that the specific invoking name is used for the voice AI assistance service, and the transmission unit delivers the content together with the MPD as a stream compliant to MPEG-DASH via broadcasting.

(16)

A transmission method executed by a transmission apparatus, the method including:

generating, by the transmission apparatus, metadata including a specific invoking name in using a universal invoking name and association information in a voice AI assistance service in cooperation with content, the universal invoking name being common to a plurality of programs that perform processing corresponding to a voice uttered by the viewer watching the content as an invoking name used for invoking the program, the association information being associated with the specific invoking name to each of the programs; and transmitting, by the transmission apparatus, the generated metadata.

(17)

An information processing apparatus including:

a processing unit configured to generate a personalized program specialized for a viewer watching content in using a voice AI assistance service in cooperation with content on the basis of generation information including at least account information of the viewer, a name of the program performing processing corresponding to a voice uttered by the viewer, and an invoking name used for invoking the personalized program, in which the processing unit updates the personalized program being generated on the basis of update information including at least the account information, the name of the personalized program, and registration information excluding the invoking name, the registration information being information registered for the personalized program.

(18)

The information processing apparatus according to (17), in which information processing apparatus is configured as a server device connected via a network to a voice processing device configured to function as a user interface of the voice AI assistance service, and the processing unit performs processing corresponding to the voice uttered by the viewer on the personalized program associated with the invoking name sent from the voice processing device.

(19)

The information processing apparatus according to (17) or (18), in which the content is delivered via broadcasting as a stream compliant to MPEG-DASH, the registration information is delivered via broadcasting using an MPD, and the processing unit updates the personalized program on the basis of the update information upon updating a version of the registration information or upon switching a channel by the viewer.

(20)

An information processing method executed by an information processing apparatus, the method including:

generating, by the information processing apparatus, a personalized program specialized for a viewer watching content in using a voice AI assistance service in cooperation with content on the basis of generation information including at least account information of the viewer, a name of the program performing processing corresponding to a voice uttered by the viewer, and an invoking name used for invoking the personalized program, in which the personalized program being generated is updated on the basis of update information including at least the account information, the name of the personalized program, and registration information excluding the invoking name, the registration information being information registered for the personalized program.

REFERENCE SIGNS LIST

1 Content-voice AI cooperation system
10 Broadcast delivery system
20 Reception apparatus
30 Voice-user interface device
40 Voice assistance server
50 Processing server
60 Internet
70 Network
101 Program content processing unit
102 Broadcast-accompanying application generation unit
103 Metadata generation unit
104 Multiplexer
105 Sending unit
200 Recording unit
201 Tuner
202 Demultiplexer
203 AV decoder
204 Broadcast-accompanying application execution unit
205 Renderer
206 Display
207 Speaker
208 Invocation name management unit
209 Invocation name conversion unit
210 Communication unit
211 Metadata management unit
212 Setting management unit
213 Skill creation and update request issuance management unit
214 Skill version management unit
220 Processing unit
301 Microphone
302 Speaker
303 Communication unit
304 Voice analysis unit
305 Communication unit
306 Setting management unit
307 Voice analysis and metadata merge unit
400 Recording unit
401 Communication unit
402 Communication unit
403 Voice analysis unit
404 Voice generation unit
405 Voice analyzing and metadata extracting unit
406 Skill creation and update unit
407 Communication unit
420, 430 Processing unit
501 Communication unit 502 Processing unit
503 Recording unit
1000 Computer
1001 CPU

The invention claimed is:

1. An information processing apparatus comprising:
circuitry configured to:
process, in using a voice artificial intelligence (AI) assistance service in cooperation with content, specific information associated with a universal invoking name included in a voice uttered by a viewer watching the content on a basis of the universal invoking name and association information, wherein
the universal invoking name is common to a plurality of programs that perform processing corresponding to the voice uttered by the viewer as an invoking name used for invoking the programs,
the association information is associated with the specific information of each of the programs,
the association information associates the universal invoking name with a specific invoking name specific to each of the programs, and
the circuitry is configured to convert the universal invoking name included in the voice uttered by the viewer into the specific invoking name on a basis of the association information.

2. The information processing apparatus according to claim 1, wherein the circuitry is configured to:
have the association information recorded in advance,
convert the universal invoking name into the specific invoking name on a basis of the recorded association information.

3. The information processing apparatus according to claim 1, wherein
the information processing apparatus is configured as a reception apparatus configured to receive the content delivered via broadcasting,
the specific invoking name is acquired from metadata delivered via broadcasting, and
the circuitry is configured to convert the universal invoking name into the specific invoking name acquired from the metadata.

4. The information processing apparatus according to claim 3, wherein
the content is delivered via broadcasting as a stream compliant to MPEG-dynamic adaptive streaming over HTTP (MPEG-DASH), and
the specific invoking name is delivered via broadcasting using a media presentation description (MPD).

5. The information processing apparatus according to claim 1, wherein
the information processing apparatus is configured as a reception apparatus configured to receive the content delivered via broadcasting, and
the circuitry is configured to convert the universal invoking name into the specific invoking name in response to a request from a voice processing device configured to function as a user interface of the voice AI assistance service.

6. The information processing apparatus according to claim 1, wherein
the association information is information obtained by associating metadata used for specifying the content being viewed by the viewer with a specific program and is included in a program for switching specified by the universal invoking name, and
the circuitry is configured to perform processing corresponding to the voice uttered by the viewer on the specific program associated with the metadata sent together with the universal invoking name on a basis of the association information being associated by the switching program.

7. The information processing apparatus according to claim 6, wherein
the information processing apparatus is configured as a server device connected via a network to a voice processing device configured to function as a user interface of the voice AI assistance service, and
the circuitry is configured to dispatch to the specific program associated with the metadata sent together with the universal invoking name from the voice processing device.

8. The information processing apparatus according to claim 7, wherein the metadata includes channel information indicating a channel of the content being viewed by the viewer and temporal information indicating a time corresponding to the utterance of the viewer on a playback time axis of the content.

9. The information processing apparatus according to claim 8, wherein the channel information and the temporal information are sent via communication together with voice data uttered by the viewer using an HTTP request.

10. The information processing apparatus according to claim 1, wherein the programs:
include at least information regarding what kind of voice to respond to, what function is implemented by using what kind of word as a parameter, or which server device or processing program practically executes the function, and
perform processing corresponding to the voice uttered by the viewer sent from a voice processing device configured to function as a user interface of the voice AI assistance service on a basis of the information.

11. The information processing apparatus according to claim 1, wherein
the content is broadcast content delivered via broadcasting, and
one of the programs is provided for each broadcaster or broadcast program.

12. The information processing apparatus according to claim 1, wherein the circuitry is configured to convert the universal invoking name included in the voice uttered by the viewer into the specific invoking name on a basis of the content being watched by the viewer.

13. The information processing apparatus according to claim 1, wherein the circuitry is configured to convert the universal invoking name included in the voice uttered by the viewer into the specific invoking name before transmitting voice data of the voice uttered by the viewer.

14. The information processing apparatus according to claim 1, wherein the voice uttered by the viewer includes the universal invoking name in addition to a wake word.

15. The information processing apparatus according to claim 1, wherein the circuitry is configured to replace the universal invoking name included in the voice uttered by the viewer into the specific invoking name on a basis of the association information.

16. The information processing apparatus according to claim 15, wherein the circuitry is configured to replace the universal invoking name included in the voice uttered by the viewer into the specific invoking name on a basis of the content being watched by the viewer.

17. An information processing method executed by an information processing apparatus, the method comprising:
    processing, by the information processing apparatus, in using a voice artificial intelligence (AI) assistance service in cooperation with content, specific information associated with a universal invoking name included in a voice uttered by a viewer watching the content on a basis of the universal invoking name and association information, wherein
    the universal invoking name is common to a plurality of programs that perform processing corresponding to the voice uttered by the viewer as an invoking name used for invoking the programs,
    the association information is associated with the specific information of each of the programs,.
    the association information associates the universal invoking name with a specific invoking name specific to each of the programs, and
    the method further includes converting the universal invoking name included in the voice uttered by the viewer into the specific invoking name on a basis of the association information.

18. A transmission apparatus comprising:
    circuitry configured to:
    generate metadata including a specific invoking name in using a universal invoking name and association information in a voice artificial intelligence (AI) assistance service in cooperation with content, the universal invoking name being common to a plurality of programs that perform processing corresponding to a voice uttered by a viewer watching the content as an invoking name used for invoking the program, the association information being associated with the specific invoking name of each of the programs, and the specific invoking name being specific to each of the programs; and
    transmit the generated metadata.

19. The transmission apparatus according to claim 18, wherein the circuitry is configured to:
    generate a media presentation description (MPD) described in an identifiable expression by identification information used for identifying that the specific invoking name is used for the voice AI assistance service, and
    deliver the content together with the MPD as a stream compliant to MPEG-dynamic adaptive streaming over HTTP (MPEG-DASH) via broadcasting.

* * * * *